United States Patent
Gehlsen

(10) Patent No.: US 10,479,529 B2
(45) Date of Patent: Nov. 19, 2019

(54) COMPOSITE PANEL TOOL

(71) Applicant: The Boeing Company, Chicago, IL (US)

(72) Inventor: Paul R. Gehlsen, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/784,501

(22) Filed: Oct. 16, 2017

(65) Prior Publication Data

US 2018/0105290 A1 Apr. 19, 2018

Related U.S. Application Data

(62) Division of application No. 14/337,679, filed on Jul. 22, 2014, now Pat. No. 9,789,980.

(51) Int. Cl.
| | |
|---|---|
| *B23B 43/00* | (2006.01) |
| *B64F 5/10* | (2017.01) |
| *B32B 37/12* | (2006.01) |
| *B32B 43/00* | (2006.01) |
| *B64F 5/40* | (2017.01) |

(52) U.S. Cl.
CPC ............... *B64F 5/10* (2017.01); *B32B 37/12* (2013.01); *B32B 43/00* (2013.01); *B64F 5/40* (2017.01); *B32B 2309/68* (2013.01); *B32B 2310/027* (2013.01); *B32B 2405/00* (2013.01); *B32B 2605/18* (2013.01); *Y10T 29/49233* (2015.01)

(58) Field of Classification Search
CPC ...... B64F 5/0081; B64F 5/0009; B32B 43/00; B32B 37/12; B32B 2605/18; B32B 2405/00; B32B 2310/027; B32B 2309/68; Y10T 29/49622
See application file for complete search history.

(56) References Cited

U.S. PATENT DOCUMENTS

| | | | | |
|---|---|---|---|---|
| 1,834,294 A | * | 12/1931 | Spahn ................. | B25H 1/0007 248/397 |
| 2,669,958 A | | 2/1954 | Sweeney | |
| 3,032,332 A | | 5/1962 | Rose et al. | |
| 5,023,987 A | | 6/1991 | Wuepper et al. | |
| 5,121,907 A | * | 6/1992 | Engwall ................. | B25B 11/00 269/131 |

(Continued)

FOREIGN PATENT DOCUMENTS

FR 2991229 A1 12/2013

OTHER PUBLICATIONS

Extended European Search Report, dated Dec. 10, 2015, regarding Application No. EP15177606.9, 8 pages.
Office Action, dated Jan. 27, 2017, regarding U.S. Appl. No. 14/337,679, 18 pages.
Notice of Allowance, dated Jun. 20, 2017, regarding U.S. Appl. No. 14/337,679, 10 pages.

(Continued)

*Primary Examiner* — Sarang Afzali
*Assistant Examiner* — Ruth G Hidalgo-Hernandez
(74) *Attorney, Agent, or Firm* — Yee & Associates, P.C.

(57) ABSTRACT

A method and apparatus for holding a panel. A rigid frame is secured on an aircraft on a rework area on the aircraft. A carrier is attached to the rigid frame. The panel is held on the carrier and the carrier moves the panel about a plurality of axes. The panel moves with the carrier such that the panel has a desired position relative to a rework opening in the rework area. The panel is attached to the aircraft while the panel is held in the desired position relative to the rework opening.

24 Claims, 18 Drawing Sheets

(56) References Cited

U.S. PATENT DOCUMENTS

| | | | |
|---|---|---|---|
| 5,626,261 A | 5/1997 | Wanstrath | |
| 5,975,183 A | 11/1999 | Reis et al. | |
| 6,101,702 A * | 8/2000 | Claycomb | B25B 11/007 |
| | | | 254/95 |
| 8,209,838 B2 | 7/2012 | Lindgren | |
| 8,302,738 B2 * | 11/2012 | Sorensen | B25H 1/0007 |
| | | | 187/203 |
| 9,789,980 B2 | 10/2017 | Gehlsen | |
| 2003/0116331 A1 * | 6/2003 | Boyl-Davis | B23Q 1/26 |
| | | | 173/1 |
| 2011/0290774 A1 | 12/2011 | Denante | |
| 2013/0341847 A1 | 12/2013 | Bense et al. | |
| 2016/0023779 A1 | 1/2016 | Gehlsen | |

OTHER PUBLICATIONS

The State Intellectual Property Office of the People's Republic of China Notification of First Office Action with English Translation, dated Sep. 29, 2018, regarding Application No. 201510434929X, 15 pages.

* cited by examiner

COMPOSITE PANEL TOOL

This application is a divisional application of U.S. patent application Ser. No. 14/337,679 filed on Jul. 22, 2014, the content of which is hereby incorporated by reference in its entirety.

BACKGROUND INFORMATION

1. Field

The present disclosure relates generally to aircraft and, in particular, to reworking inconsistencies in aircraft. Still more particularly, the present disclosure relates to a method and apparatus for holding a composite panel for reworking a composite fuselage of an aircraft.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing or stabilizer sections joined to form a stabilizer.

An inconsistency may occur on a composite structure of the aircraft during manufacturing or operation of the aircraft. For example, an inconstancy may occur in a fuselage of the aircraft. The inconsistency may be reworked. The type of rework may depend on the size of the inconsistency. For example, a portion of the fuselage, including the inconsistency, is removed leaving a rework opening. A composite panel is trimmed to fit in the rework opening as a replacement for the portion removed. After the composite panel is trimmed to desired dimensions, the composite panel is positioned in the rework opening and attached to the aircraft. The composite panel may also be referred to as a plug or patch.

The tolerances of fit of the composite panel require a very precise trimming to fit within the rework opening. The fit also involves maintaining a contour of the fuselage so that the composite panel is flush with the rest of the fuselage. Also, in some cases, the composite panel may have stringers on the inner side. In this case, the fit also involves aligning those stringers with the existing stringers in the fuselage around the rework opening.

This process becomes increasingly challenging as the size of the composite panel increases. For example, cutting, positioning, and attaching the composite panel becomes more difficult and time consuming with the increase in size. For example, composite panel sizes from 2'×2' to 4'×8' are considered a medium area repair (MAR) and have a size that is challenging for human operators performing rework on the fuselage. Therefore, it would be desirable to have a method and apparatus that takes into account at least some of the issues discussed above, as well as other possible issues.

SUMMARY

In one illustrative embodiment, a method for holding a panel is provided. A rigid frame is secured on an aircraft on a rework area on the aircraft. A carrier is attached to the rigid frame. The panel is held on the carrier and the carrier moves the panel about a plurality of axes. The panel moves with the carrier such that the panel has a desired position relative to a rework opening in the rework area. The panel is attached to the aircraft while the panel is held in the desired position relative to the rework opening.

In another illustrative embodiment, an apparatus comprises a carrier that holds a panel, a rigid frame, and a mounting system associated with the rigid frame. The rigid frame has a side that conforms to a surface of an aircraft. The mounting system holds the carrier and moves the carrier with the panel about a plurality of axes. A rigid frame has a side that conforms to a surface of an aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more considerations. For example, the illustrative embodiments recognize and take into account that the size of the composite panel may make positioning the composite panel relative to the rework opening more difficult that desired with medium area repairs. For example, the composite panel may be held by one or more human operators and marked for trimming and trimmed. The composite panel may then be positioned again by the human operators to determine whether additional trimming is needed. After trimming is completed, the positioning by the human operators to precisely locate the panel in the rework opening of the fuselage for attachment to the aircraft is tedious and difficult.

The illustrative embodiments recognize and take into account that it may be desirable to have a tool that allows for handling, manipulation, and adjustments of a composite panel in different axes to position the composite panel with a desired amount of precision when performing rework on a fuselage of an aircraft. Thus, the illustrative embodiments provide a method and apparatus for holding a panel and, in particular, a composite panel.

In one illustrative embodiment, a rigid frame is secured on a fuselage of an aircraft over an opening in a rework area on the fuselage. A carrier is attached to the rigid frame. A composite panel is held on the carrier and the carrier moves the composite panel about a plurality of axes. The composite panel is moved with the carrier such that the composite panel has a desired position relative to the rework opening. The composite panel is attached to the aircraft while the composite panel is held in the desired position.

Figure 1:
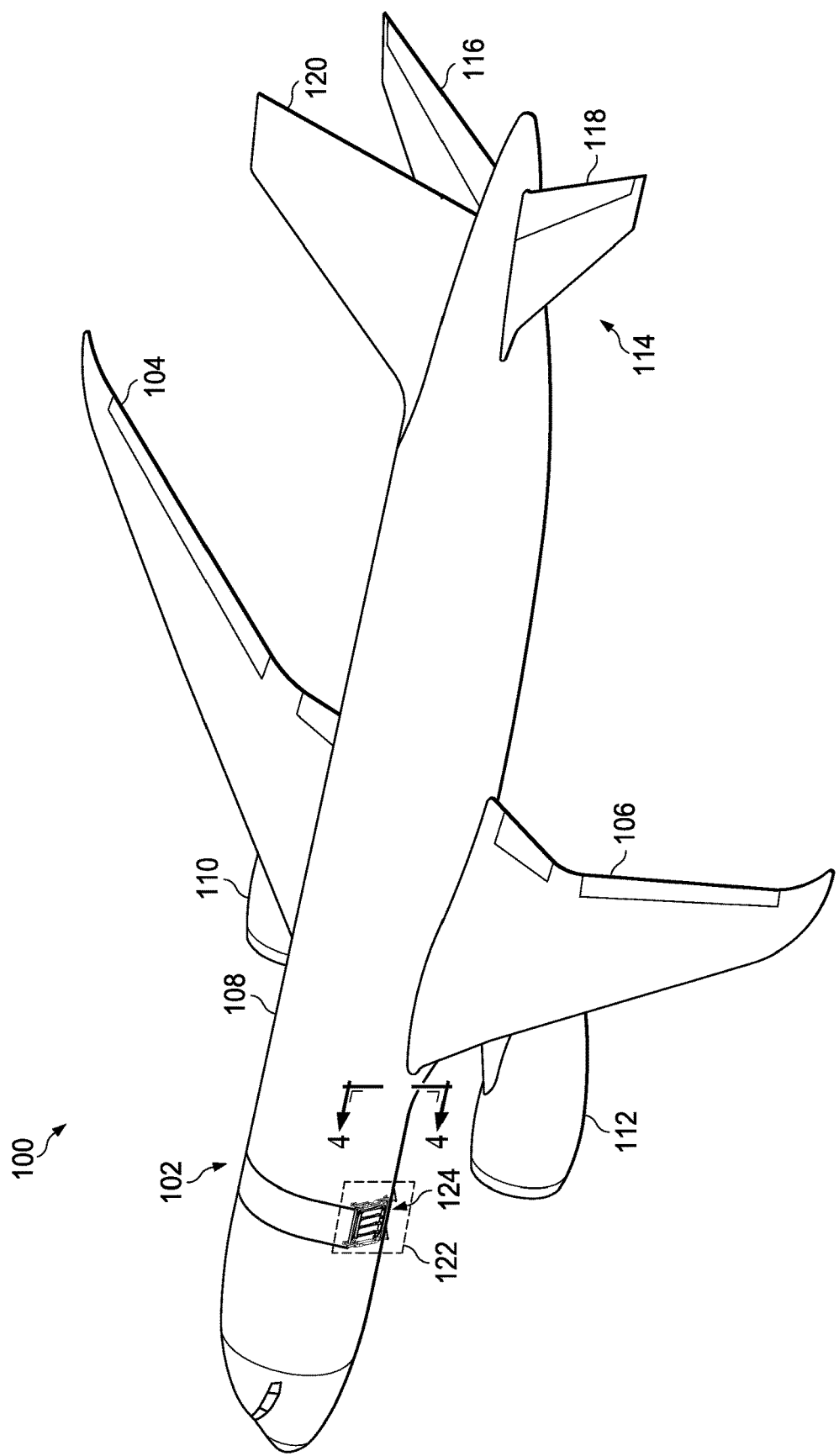
FIG. 1 is an illustration of a rework environment in accordance with an illustrative embodiment.

With reference now to the figures, and in particular with reference to FIG. 1, an illustration of a rework environment is depicted in accordance with an illustrative embodiment. In rework environment 100, aircraft 102 has wing 104 and wing 106 attached to fuselage 108. Aircraft 102 includes engine 110 attached to wing 104 and engine 112 attached to wing 106.

Fuselage 108 has tail section 114. Horizontal stabilizer 116, horizontal stabilizer 118, and vertical stabilizer 120 are attached to tail section 114 of fuselage 108.

In this illustrative example, many of the parts of aircraft 102 are formed from composite materials. Some of these parts may be comprised of other materials in addition to or in place of the composite materials.

For example, fuselage 108 is comprised of sections that are connected to each other to form fuselage 108. These sections may be in the form of barrels. As another example, wing 104 and wing 106 also may be formed from composite materials.

As depicted, fuselage 108 of aircraft 102 requires rework in rework area 122. In this illustrative example, panel tool 124 is used to perform rework in rework area 122 of fuselage 108. In this illustrative example, panel tool 124 is a device that allows for at least one of handling, manipulation, or adjustments in many axes to precisely position a composite panel to perform rework on an inconsistency in rework area 122.

Figure 2:
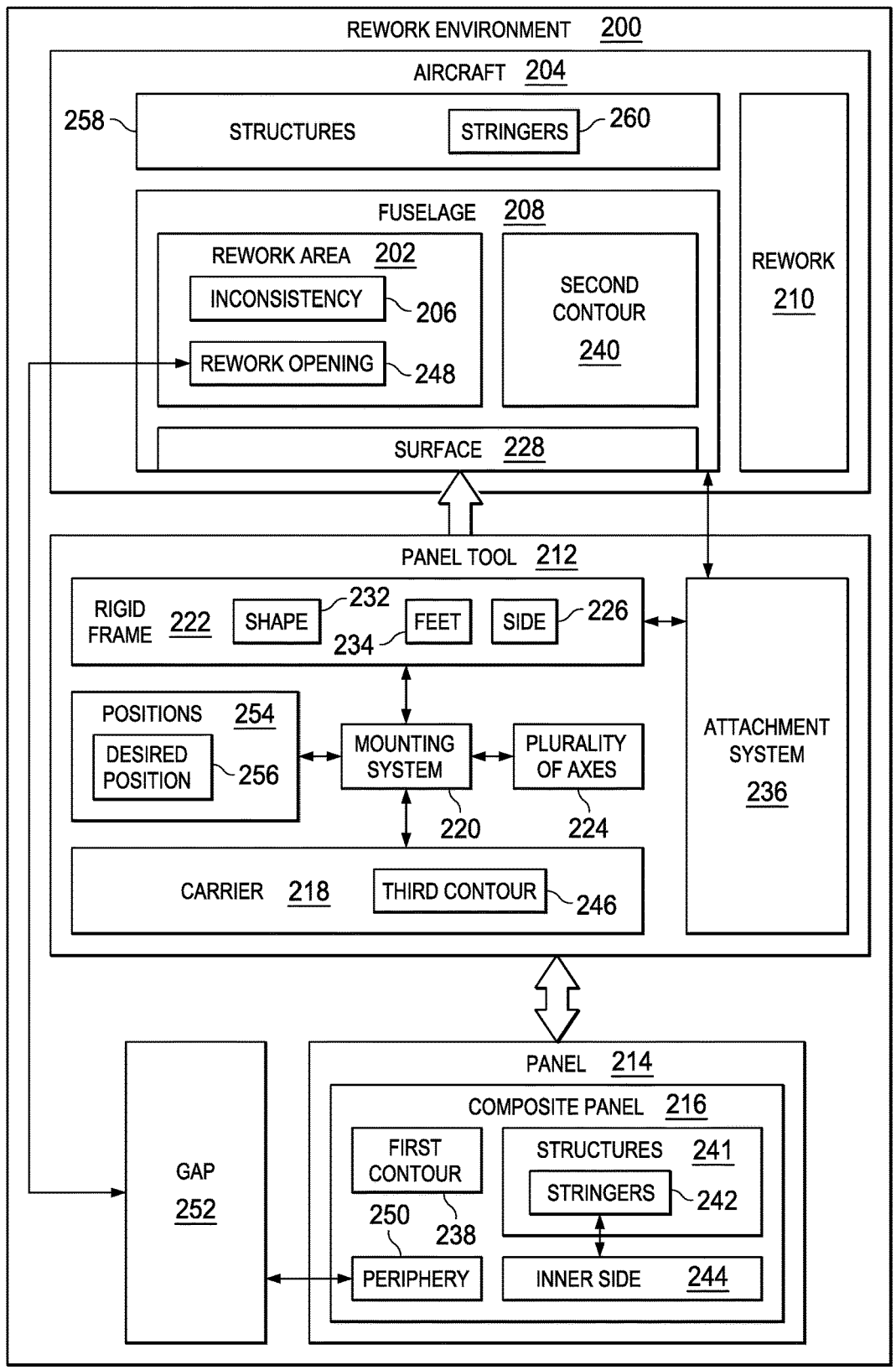
FIG. 2 is an illustration of a block diagram of a rework environment in accordance with an illustrative embodiment.

With reference next to FIG. 2, an illustration of a block diagram of a rework environment is depicted in accordance with an illustrative embodiment. In this illustrative example, rework environment 100 in FIG. 1 is an example of one implementation for rework environment 200 shown in FIG. 2.

As depicted, rework area 202 on aircraft 204 requires rework for inconsistency 206 located in rework area 202. In this illustrative example, inconsistency 206 may be, for example, a crack, a puncture, or some other type of inconsistency that should be removed or reduced.

In this illustrative example, rework area 202 is located on fuselage 208 of aircraft 204. As depicted, rework 210 may be performed in rework area 202 using panel tool 212.

As depicted, panel tool 212 holds panel 214. In this illustrative example, panel 214 may take the form of composite panel 216. Composite panel 216 has first contour 238 matching second contour 240 of fuselage 208 at rework area 202. Composite panel 216 also may have structures 241 on inner side 244. In this illustrative example, structures 241 take the form of stringers 242. As depicted, composite panel 216 is a patch or plug for fuselage 208 of aircraft 204.

As depicted, composite panel 216 may have various dimensions. Dimensions for composite panel 216 may be, for example, about 2'×2' up to about 4'×8' in this illustrative example. When composite panel 216 has these dimensions, rework 210 may be considered a medium area repair (MAR).

In another illustrative example, panel 214 may be comprised of other materials other than a composite material. For example, panel 214 may be comprised of material selected from one of a composite material, a metal, a metal alloy, titanium, carbon fiber, aluminum, or other suitable materials.

In this illustrative example, panel tool 212 has a number of different components. As depicted, panel tool 212 comprises carrier 218, mounting system 220, and rigid frame 222.

Carrier 218 holds composite panel 216. As depicted, carrier 218 has third contour 246 that matches first contour 238 of composite panel 216.

Mounting system 220 is associated with rigid frame 222. Mounting system 220 holds carrier 218 and in particular connects carrier 218 to rigid frame 222. More specifically, carrier 218 may be removably connected to mounting system 220 that is associated with rigid frame 222. In other words, carrier 218 with composite panel 216 may be connected to and removed from rigid frame 222 while rigid frame 222 is secured to aircraft 204.

When a component is "associated" with another component, the association is a physical association in the depicted examples. For example, a first component, such as mounting system 220, may be considered to be physically associated with a second component, such as rigid frame 222, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

Additionally, mounting system 220 moves carrier 218 with composite panel 216 about plurality of axes 224. In other words, mounting system 220 may move composite panel 216 into different positions relative to aircraft 204.

In these illustrative examples, plurality of axes 224 may be three axes such as an x-axis, a y-axis, and a z-axis. Mounting system 220 may move composite panel 216 along each of these axes, as well as rotate composite panel 216 about each of these axes.

As a result, mounting system 220 with movement about plurality of axes 224 allows for movement of composite panel 216 with six degrees of freedom. For example, mounting system 220 moves composite panel 216 about plurality of axes 224 with at least one of longitudinal movement or twisting movement.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Rigid frame 222 has side 226 that conforms to surface 228 of aircraft 204 and, in particular, to surface 228 of fuselage 208. Side 226 may conform to surface 228 in a number of different ways. For example, side 226 may have shape 232 that conforms to surface 228.

Further, in another illustrative example, side 226 may conform to surface 228 through feet 234 on side 226. Feet 234 conform to surface 228 of fuselage 208. Feet 234 may be customized for each type of contour that may be found on fuselage 208 for aircraft 204. Feet 234 may be customized for the contour of a specific aircraft. Feet 234 may be manufactured using additive manufacturing, such as three-dimensional printing.

In this manner, rigid frame 222 is secured to fuselage 208 in rework area 202 with reduced undesired movement of panel tool 212. Carrier 218 may be removably attached while holding composite panel 216 through mounting system 220. As a result, a higher level of precision is present for positioning composite panel 216 while performing rework 210 in rework area 202 as compared to currently used techniques for performing rework 210 in rework area 202.

As depicted, panel tool 212 also includes attachment system 236. In this example, attachment system 236 secures rigid frame 222 to fuselage 208. In the depicted example, attachment system 236 may be implemented using a group of straps. As used herein, a "group of," when used with reference items, means one or more items. For example, a group of straps is one or more straps.

Attachment system 236 may include other types of mechanisms in addition to or in place of the group of straps. For example, rigid frame 222 may be secured to fuselage 208 using at least one of the group of straps, double sided tape, friction contact, a vacuum system, or some other suitable type of mechanism used in attachment system 236 to secure rigid frame 222 to surface 228 of fuselage 208.

In performing rework 210 in rework area 202 on fuselage 208 of aircraft 204, panel tool 212 is secured to fuselage 208. In particular, rigid frame 222 is secured to fuselage 208 by attachment system 236.

Composite panel 216 may or may not be attached to panel tool 212 when panel tool 212 is secured to fuselage 208. If composite panel 216 is not attached to panel tool 212 when panel tool 212 is secured to fuselage 208, composite panel 216 may be attached to carrier 218. Carrier 218 may then be connected to rigid frame 222. As described above, this connection of carrier 218 to rigid frame 222 is formed through mounting system 220.

Composite panel 216 may be positioned relative to rework area 202 on fuselage 208. For example, composite panel 216 may be positioned relative to rework opening 248 in fuselage 208. Rework opening 248 is formed when removing portions of fuselage 208 in which inconsistency 206 is located.

The positioning of composite panel 216 relative to rework opening 248 may be performed to determine whether or how much trimming is needed for composite panel 216. In this illustrative example, trimming involves removing material from periphery 250 of composite panel 216. The trimming is performed to obtain a desired fit for composite panel 216 within rework opening 248.

In these illustrative examples, gap 252 is desired between periphery 250 of composite panel 216 and fuselage 208 for a desired fit. When the desired fit is present, composite panel 216 is attached to aircraft 204.

Composite panel 216 is designed to "float" in rework opening 248 when composite panel 216 is attached to aircraft 204. As depicted, composite panel 216 is not attached to fuselage 208 such that a load is not transferred between fuselage 208 and composite panel 216.

Composite panel 216 may be marked for trimming. For example, composite panel 216 may be marked with a pencil, contrasting marker, or scribed. Carrier 218 with composite panel 216 is then disconnected from rigid frame 222. Composite panel 216 on carrier 218 may then be handled and moved to a location for trimming. Then, composite panel 216 on carrier 218 may be placed back into the prior position by connecting carrier 218 to rigid frame 222 through mounting system 220.

Composite panel 216 can then be compared to rework opening 248 to determine whether gap 252 between periphery 250 of composite panel 216 and fuselage 208 has a desired width. This process of comparing, marking, and trimming may be repeated until composite panel 216 has desired dimensions to have a desired fit within rework opening 248 when composite panel 216 has a desired position within rework opening 248.

With panel tool 212, composite panel 216 on carrier 218 may be removed from, and put back onto, rigid frame 222 any number of times with composite panel 216 being returned to the same position, unless repositioning of composite panel 216 is desired. The consistent positioning occurs due to use of rigid frame 222 secured to fuselage 208 in rework area 202 on fuselage 208 and mounting system 220 with carrier 218 being removably attached to rigid frame 222 through mounting system 220.

As depicted, mounting system 220 may move composite panel 216 to any number of positions 254 with movement occurring about plurality of axes 224. When desired position 256 in positions 254 is obtained, carrier 218 with composite panel 216 may be detached and reattached any number of times to rigid frame 222 through mounting system 220 in desired position 256.

When composite panel 216 is ready for installation, composite panel 216 is moved to desired position 256 for attachment to aircraft 204. In this illustrative example, desired position 256 provides for gap 252 between periphery 250 of composite panel 216 and fuselage 208 within rework opening 248. As depicted, gap 252 is employed to eliminate edge loading of composite panel 216 to fuselage 208 in this particular example. In other words, contact between the edge of periphery 250 of composite panel 216 and fuselage 208 are avoided. In this manner, the transfer of loads through periphery 250 of composite panel 216 is eliminated.

In desired position 256, composite panel 216 is attached to aircraft 204. This attachment is performed by attaching composite panel 216 to one or more of structures 258 in aircraft 204, such as stringers 260.

In the illustrative example, the attachment is such that loads are not transferred between composite panel 216 and fuselage 208. In such a repair, the splice hardware and fasteners surrounding rework area 202 carry and transmit the loads. Once composite panel 216 is attached to one or more of structures 258, gap 252 may be sealed.

Also, coatings may be applied to at least one of composite panel 216 or fuselage 208. These coatings may include paint, sealants, and other suitable coatings. Also, a decal may be applied as needed.

In this manner, rework 210 of rework area 202 may be performed more quickly and with more precision as compared to performing rework 210 with currently used techniques and tools. Panel tool 212 may be used to provide more precise and more consistent positioning of composite panel 216 or some other type of panel 214. Also, panel tool 212 may be attached to aircraft 204 without forming holes for attachment system 236.

Panel tool 212 is modular and allows for rework 210 to be performed with composite panels having different contours. For example, first contour 238 for carrier 218 may be adjusted replacing parts on carrier 218 that define first contour 238. In another illustrative example, a new carrier may be fabricated for use with rigid frame 222.

Also, with movement of composite panel 216 about or on plurality of axes 224, alignment of structures 241 on inner side 244 of composite panel 216 with structures 241 in aircraft 204 may be made more precisely and more easily. These structures may be, for example, stringers 242 on inner side 244.

The illustration of rework environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, rework area 202 may be a location other than on fuselage 208 of aircraft 204. For example, rework area 202 may be located on a wing, a horizontal stabilizer, a vertical stabilizer, or on some other suitable location on aircraft 204. In another illustrative example, attachment system 236 may be considered a separate component from panel tool 212.

In other examples, composite panel 216 may have other dimensions and shapes other than a square or rectangular shape. For example, composite panel 216 may have a hexagonal shape, a circular shape, or some other suitable shape.

Figure 3:
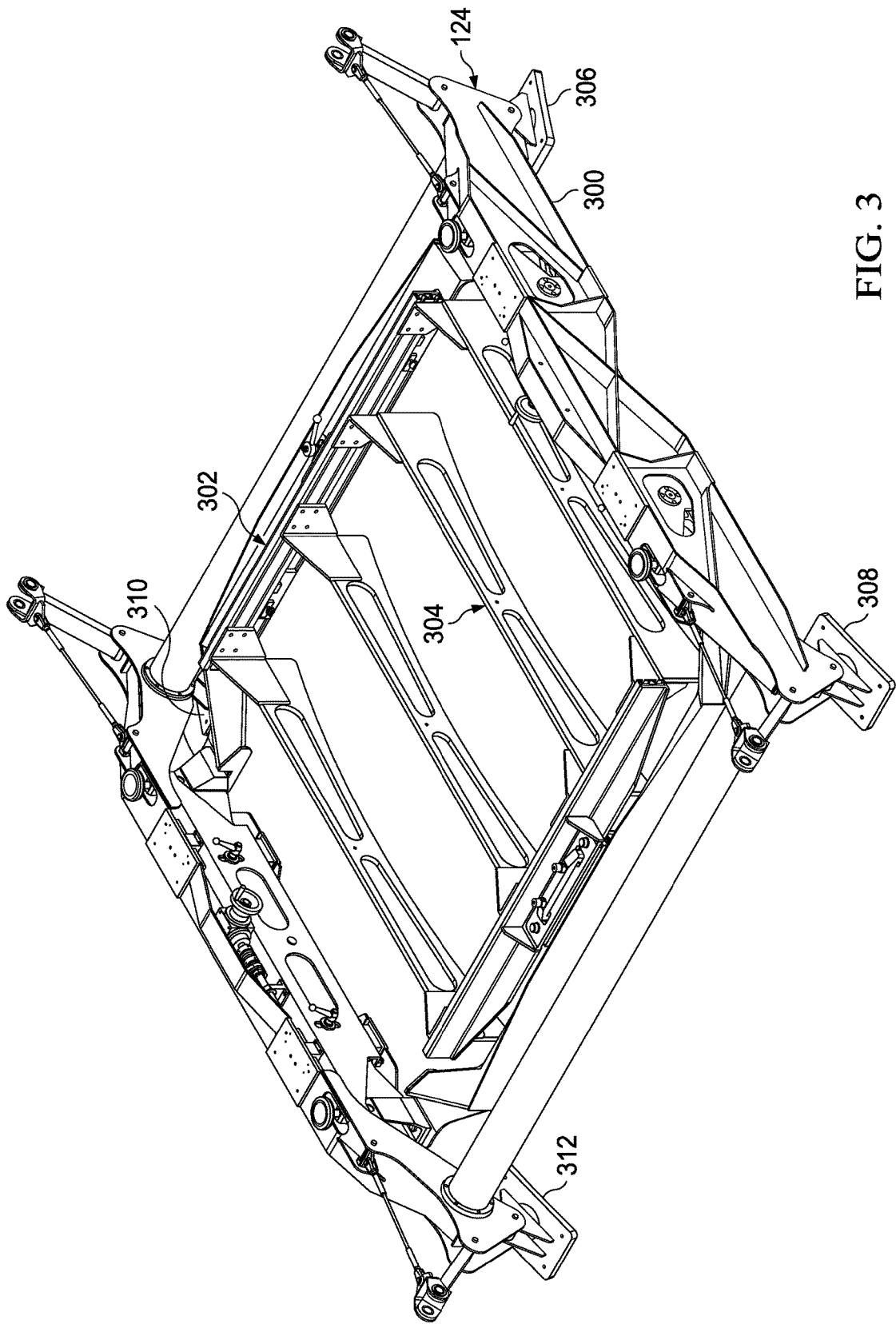
FIG. 3 is an illustration of a panel tool in accordance with an illustrative embodiment.

With reference next to FIG. 3, an illustration of a panel tool is depicted in accordance with an illustrative embodiment. In this illustrative example, an illustration of panel tool 124 in FIG. 1 is depicted. Panel tool 124 is shown in this figure is an example of a physical implementation of panel tool 212 shown in block form in FIG. 2.

In this illustrative example, panel tool 124 has a number of components. As depicted, panel tool 124 includes rigid frame 300, mounting system 302, and carrier 304.

Rigid frame 300 is designed to be placed on, and secured to, fuselage 108. Carrier 304 is designed to carry a composite panel.

Mounting system 302 is designed to connect carrier 304 to rigid frame 300. Additionally, mounting system 302 is also designed to position carrier 304 relative to fuselage 108. In other words, mounting system 302 moves carrier 304 and, in turn, moves a composite panel that is held by carrier 304. In this manner, mounting system 302 positions a composite panel relative to fuselage 108.

As depicted in this figure, rigid frame 300 has foot 306, foot 308, foot 310, and foot 312. These feet conform to the surface of fuselage 108.

Figure 4:
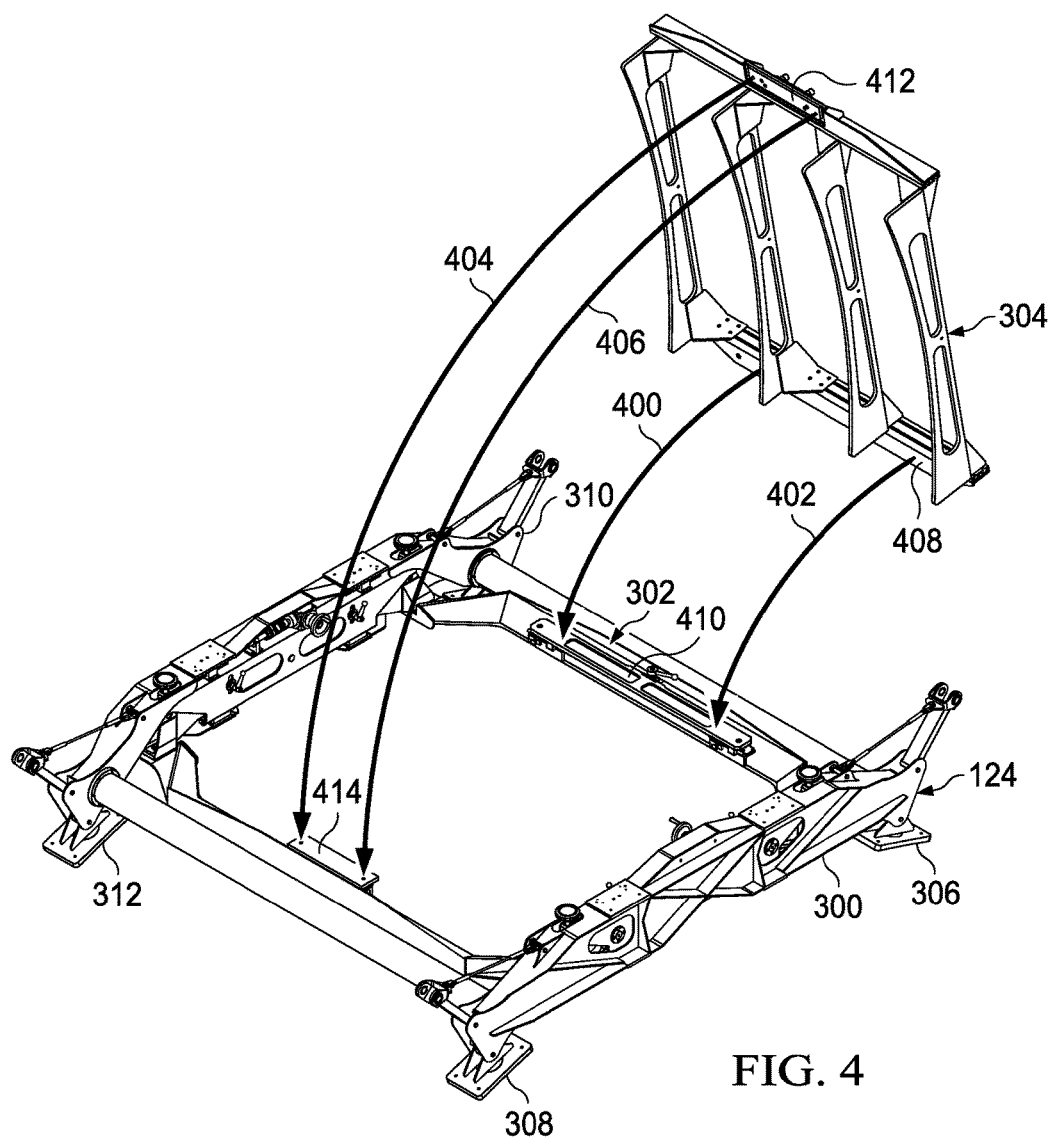
FIG. 4 is another illustration of a panel tool in accordance with an illustrative embodiment.

Turning next to FIG. 4, another illustration of a panel tool is depicted in accordance with an illustrative embodiment. In this illustrative example, carrier 304 is shown as being lifted away from rigid frame 300. Arrow 400, arrow 402, arrow 404, and arrow 406 show the manner in which carrier 304 may be placed onto mounting system 302 to connect carrier 304 to rigid frame 300.

As depicted, attachment section 408 on carrier 304 may engage attachment section 410 on mounting system 302 as shown by arrow 400 and arrow 402. Attachment section 412 on carrier 304 may engage attachment section 414 on mounting system 302 as shown by arrow 404 and arrow 406.

In this illustrative example, carrier 304 is removably attached to rigid frame 300 by mounting system 302. In this manner, carrier 304 may be connected to and removed from rigid frame 300 to allow for trimming or other operations with respect to a composite panel that may be held on carrier 304. With mounting system 302, the position of carrier 304 and the composite panel is repeatable. The repeatable positioning of the composite panel occurs without having to make new adjustments or measurements when reattaching carrier 304 to rigid frame 300.

Figure 5:
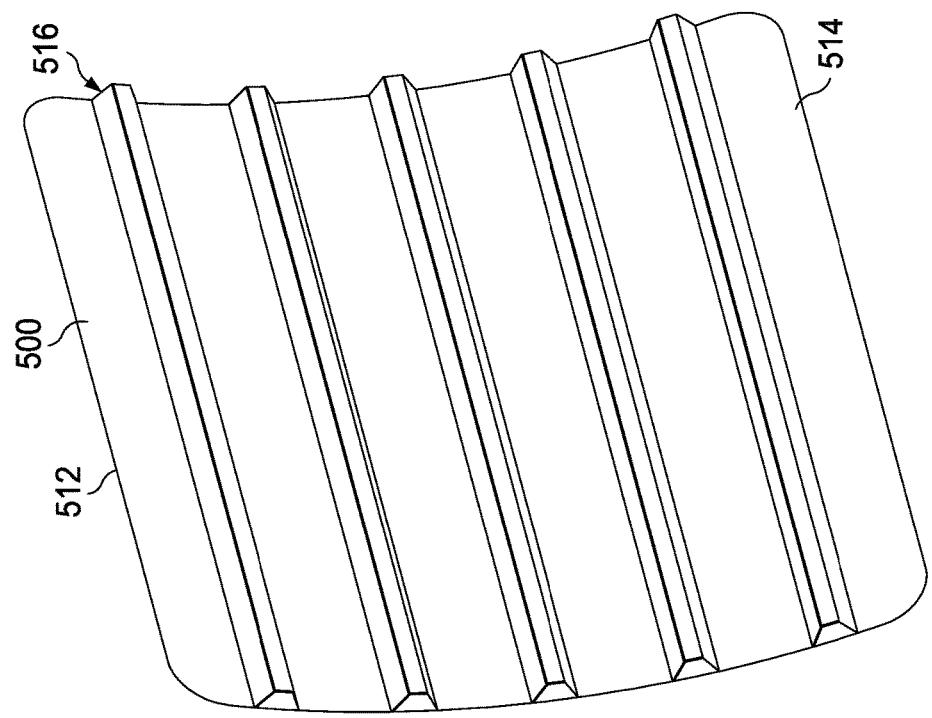
FIG. 5 is an illustration of a carrier in a panel tool in accordance with an illustrative embodiment.
Figure 5:
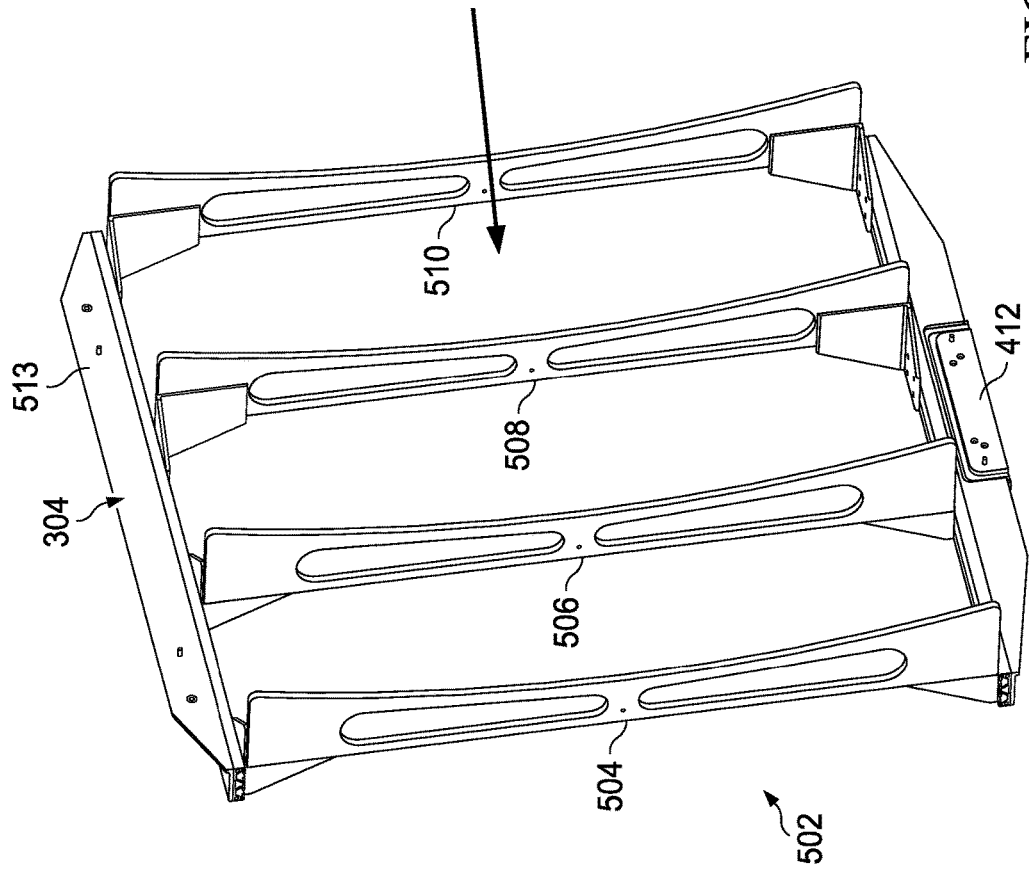

Turning next to FIG. 5, an illustration of a carrier in a panel tool is depicted in accordance with an illustrative embodiment. In this illustrative example, carrier 304 is designed to receive and hold composite panel 500.

As depicted, carrier 304 has a contour as defined by sections 502. In this illustrative example, sections 502 may take the form of customized headers.

In this illustrative example, sections 502 include section 504, section 506, section 508, and section 510. As depicted, sections 502 are connected to frame 513. Sections 502 have a shape that defines a contour for carrier 304 that matches the contour on outer side 514 of composite panel 500 in this illustrative.

In the illustrative examples, sections 502 may be replaced with new sections customized for another composite panel having a different contour from composite panel 500 to be held on carrier 304. The attachment of composite panel 500 to carrier 304 may be performed a number different ways. For example, composite panel 500 may be attached to carrier 304 using at least one of double-sided tape, removable adhesive, clamping mechanisms, a vacuum system comprising vacuum cups, fasteners, or other suitable attachment methods.

Also seen in this example are stringers 516 located on inner side 512 of composite panel 500. Stringers 516 are aligned with stringers in aircraft 102 in rework area 122 when positioning and attaching composite panel 500 to aircraft 102 in FIG. 1. The attachment of composite panel 500 to aircraft 102 may be performed a number different ways. For example, composite panel 500 may be attached aircraft 102 using at least one of fasteners, bonding of splice plates that span from the composite panel 500 to existing structures within aircraft 102.

Figure 6:
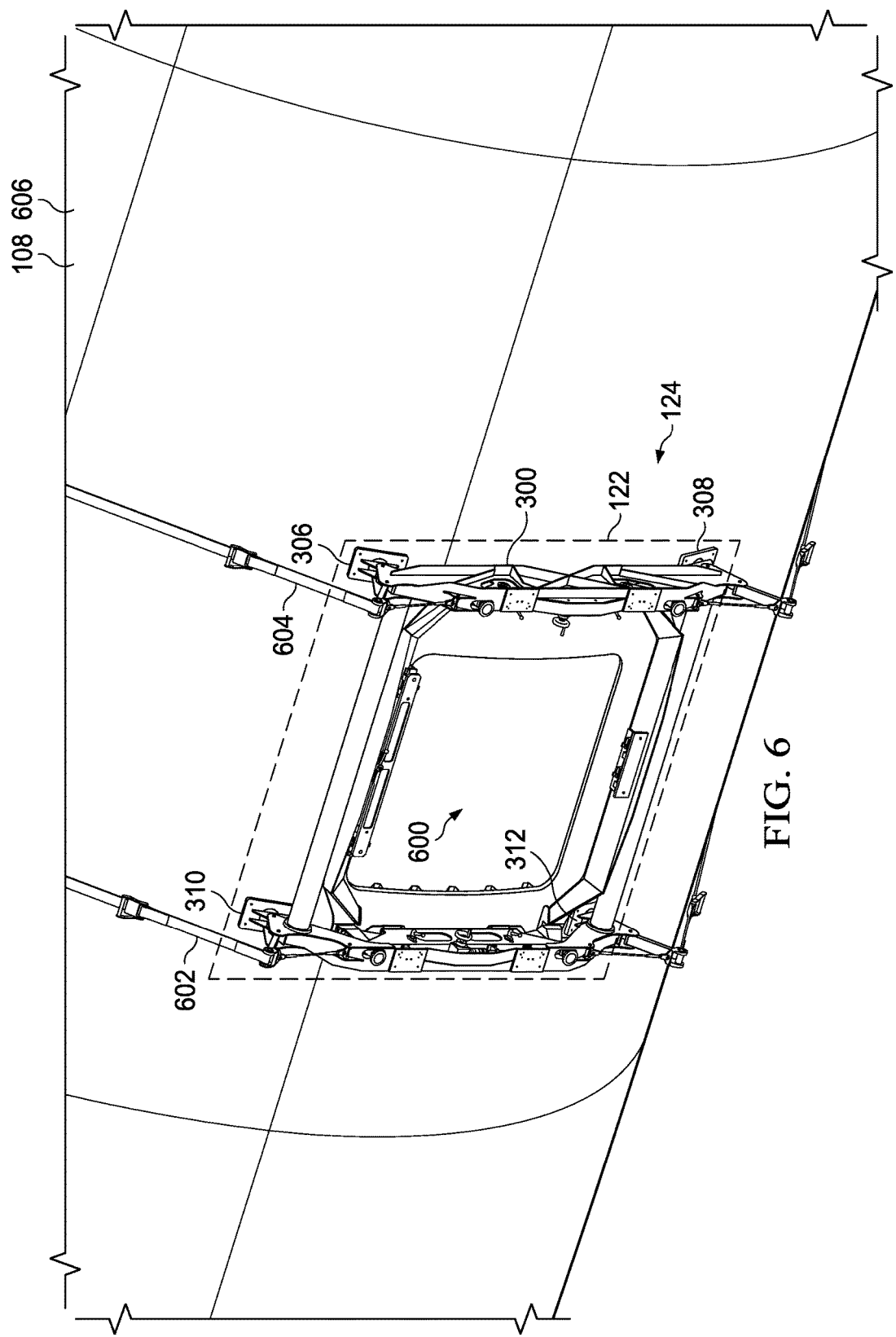
FIG. 6 is an illustration of a panel tool secured to a fuselage in a rework area in accordance with an illustrative embodiment.

In FIGS. 6-10, an illustration of a process for performing rework on a fuselage using a panel tool is depicted in accordance with an illustrative embodiment. With reference first to FIG. 6, an illustration of a panel tool secured to a fuselage in a rework area is depicted in accordance with an illustrative embodiment. In this example, panel tool 124 is shown secured to rework area 122. In particular, rigid frame 300 is secured to fuselage 108. As depicted, carrier 304 has been removed and rework opening 600 has been formed in rework area 122.

In this illustrative example, strap 602 and strap 604 secure rigid frame 300 to surface 606 of fuselage 108. In this illustrative example, strap 602 and strap 604 placed are around fuselage 108. In this illustrative example, strap 602 and strap 604 are part of an attachment system and may be considered part of panel tool 124 or a separate component from panel tool 124.

Figure 7:
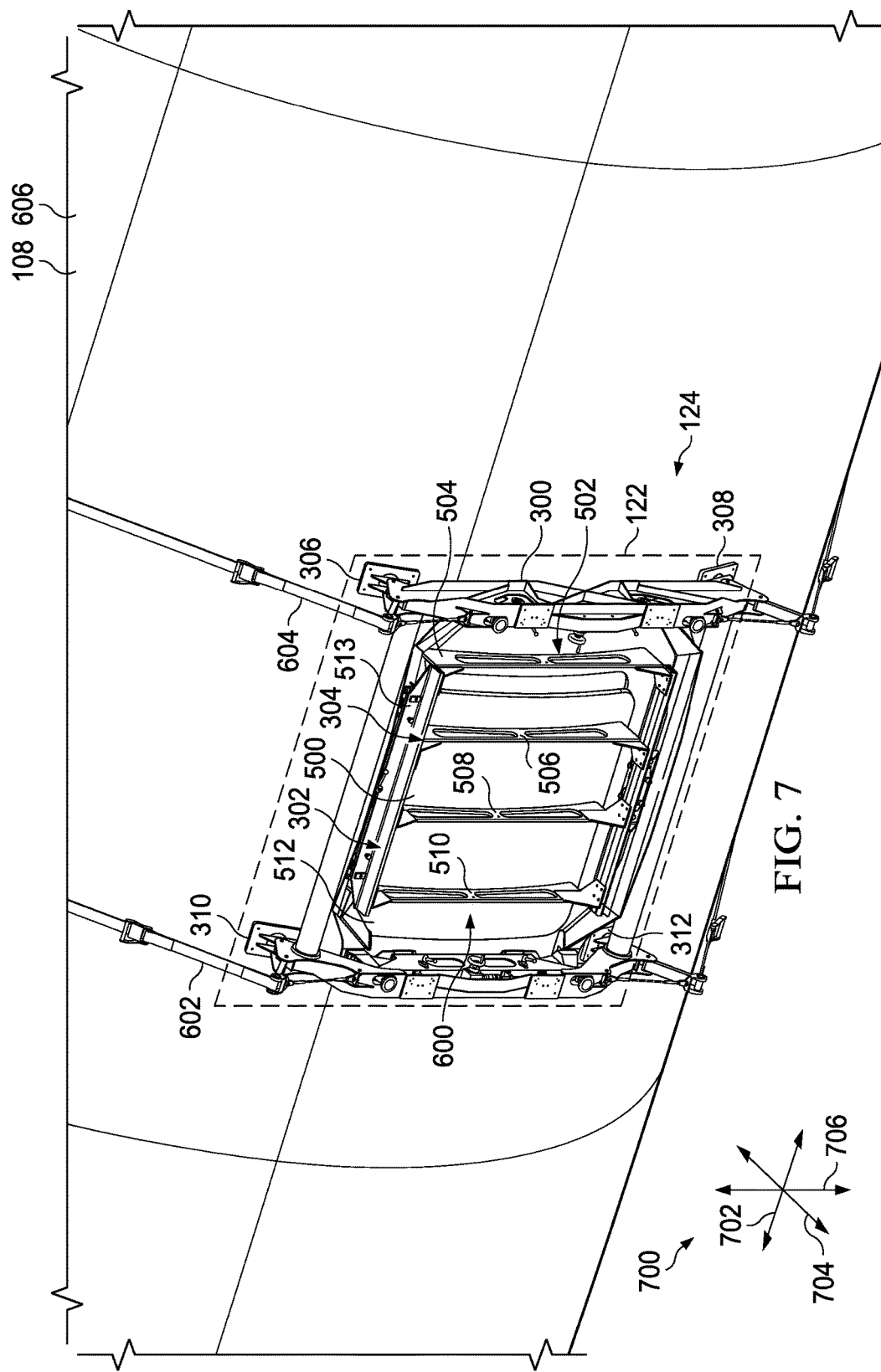
FIG. 7 is an illustration of a composite panel positioned relative to a rework opening in accordance with an illustrative embodiment.

Turning next to FIG. 7, an illustration of a composite panel positioned relative to a rework opening is depicted in accordance with an illustrative embodiment. In this figure, carrier 304 is shown connected to rigid frame 300 through mounting system 302. Additionally, composite panel 500 is held by carrier 304.

In this example, composite panel 500 may be moved about plurality of axes 700. As depicted, plurality of axes 700 includes x-axis 702, y-axis 704, and z-axis 706. In this illustrative example, x-axis 702 and y-axis 704 may define a plane through rigid frame 300. As depicted, z-axis 706 extends perpendicular to the plane defined by x-axis 702 and y-axis 704.

Movement of composite panel 500 occurs through mounting system 302 moving carrier 304 about plurality of axes 700. The movement may be along one of plurality of axes 700, rotation about one of plurality of axes 700, or both.

In this illustrative example, composite panel 500 is positioned over rework opening 600. The positioning may be an identification of whether composite panel 500 needs to be trimmed to have a desired fit in rework opening 600. As depicted, composite panel 500 may be marked to identify portions of composite panel 500 that may need to be removed to obtain a desired fit for composite panel 500 within rework opening 600.

Figure 8:
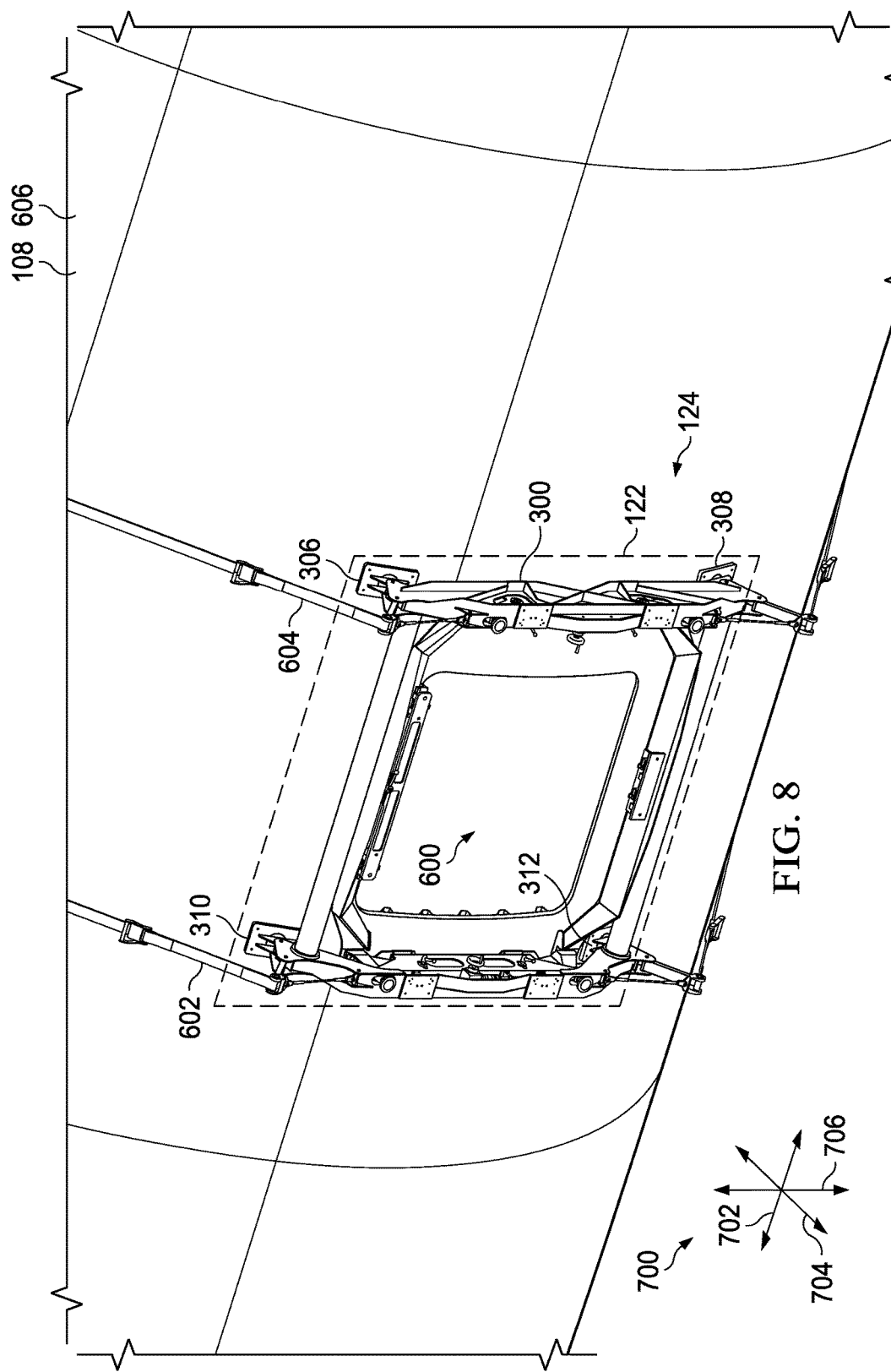
FIG. 8 is an illustration of a carrier with a composite panel detached from a rigid frame in a panel tool for trimming in accordance with an illustrative embodiment.

In FIG. 8, an illustration of a carrier with a composite panel detached from a rigid frame in a panel tool for trimming is depicted in accordance with an illustrative embodiment. In this view, carrier 304 with composite panel 500 has been detached from rigid frame 300 and is not shown in this view.

With the ability to detach carrier 304, composite panel 500 may be moved to a location or placed in a position for trimming composite panel 500. After trimming, carrier 304 with composite panel 500 may be attached to rigid frame 300 for comparison to rework opening 600.

Figure 9:
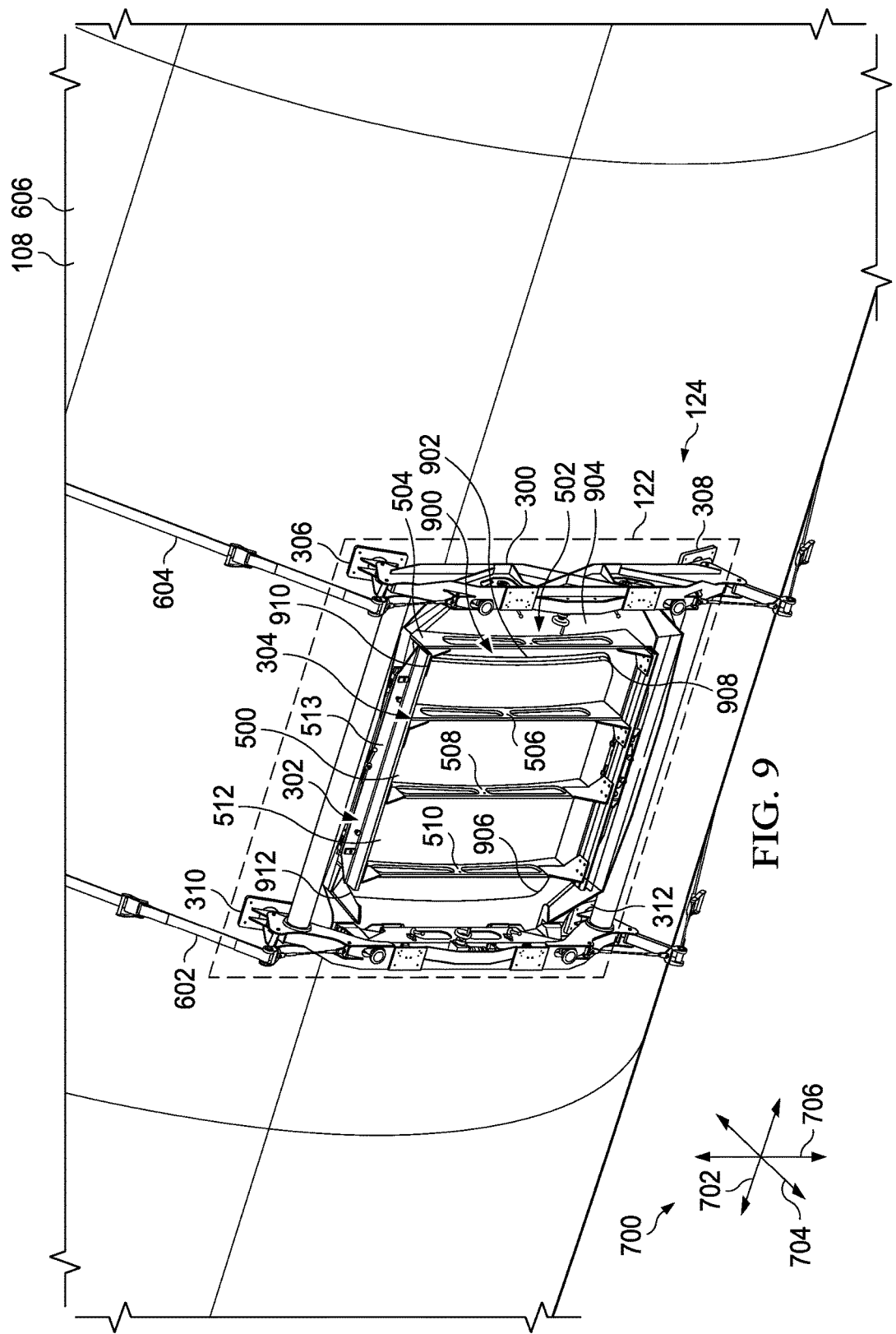
FIG. 9 is an illustration of a composite panel in a position relative to a rework opening in accordance with an illustrative example.

With reference next to FIG. 9, an illustration of a composite panel in a position relative to a rework opening is depicted in accordance with an illustrative example. In this view, composite panel 500 is positioned within rework opening 600 after reattaching carrier 304 to rigid frame 300 by connecting carrier 304 to mounting system 302.

With composite panel 500 in this position relative to rework opening 600, a determination may be made as to whether composite panel 500 has a desired fit, position, or both relative to rework opening 600 in rework area 122. In this example, gap 900 is present between periphery 902 of composite panel 500 and fuselage 108. In particular, gap 900 is present between periphery 902 of composite panel 500 and wall 904 of fuselage 108.

For example, if gap 900 does not have a desired width, composite panel 500 may be trimmed if needed. In other cases, composite panel 500 may have the desired dimensions and may be moved about plurality of axes 700 to obtain a desired position of composite panel 500.

This movement may be longitudinal in a direction of plurality of axes 700, rotation relative to plurality of axes 700, or some combination thereof. In this illustrative example, this movement may allow for movement of corner 906, corner 908, corner 910, and corner 912 of composite panel 500 using longitudinal movement for twisting movement to obtain a desired fit of composite panel 500 within rework opening 600. This movement of composite panel 500 may be made to align structures, such as stringers 516 on inner side 512 of composite panel 500, with corresponding stringers within aircraft 102.

When composite panel 500 is in a desired position relative to rework opening 600, composite panel 500 is attached to aircraft 102. In this illustrative example, composite panel 500 has gap 900 and is attached to aircraft 102 such that composite panel 500 "floats" within rework opening 600. In other words, loads are not transferred from fuselage 108 to composite panel 500.

As depicted, the attachment of composite panel 500 to aircraft 102 is to a structure in aircraft 102 other than fuselage 108 in this example. Composite panel 500 is attached to structures in aircraft 102 in a number of different ways. For example, composite panel 500 may be attached to the structures using splices, fasteners, bonding materials, adhesives, and other suitable mechanisms.

Figure 10:
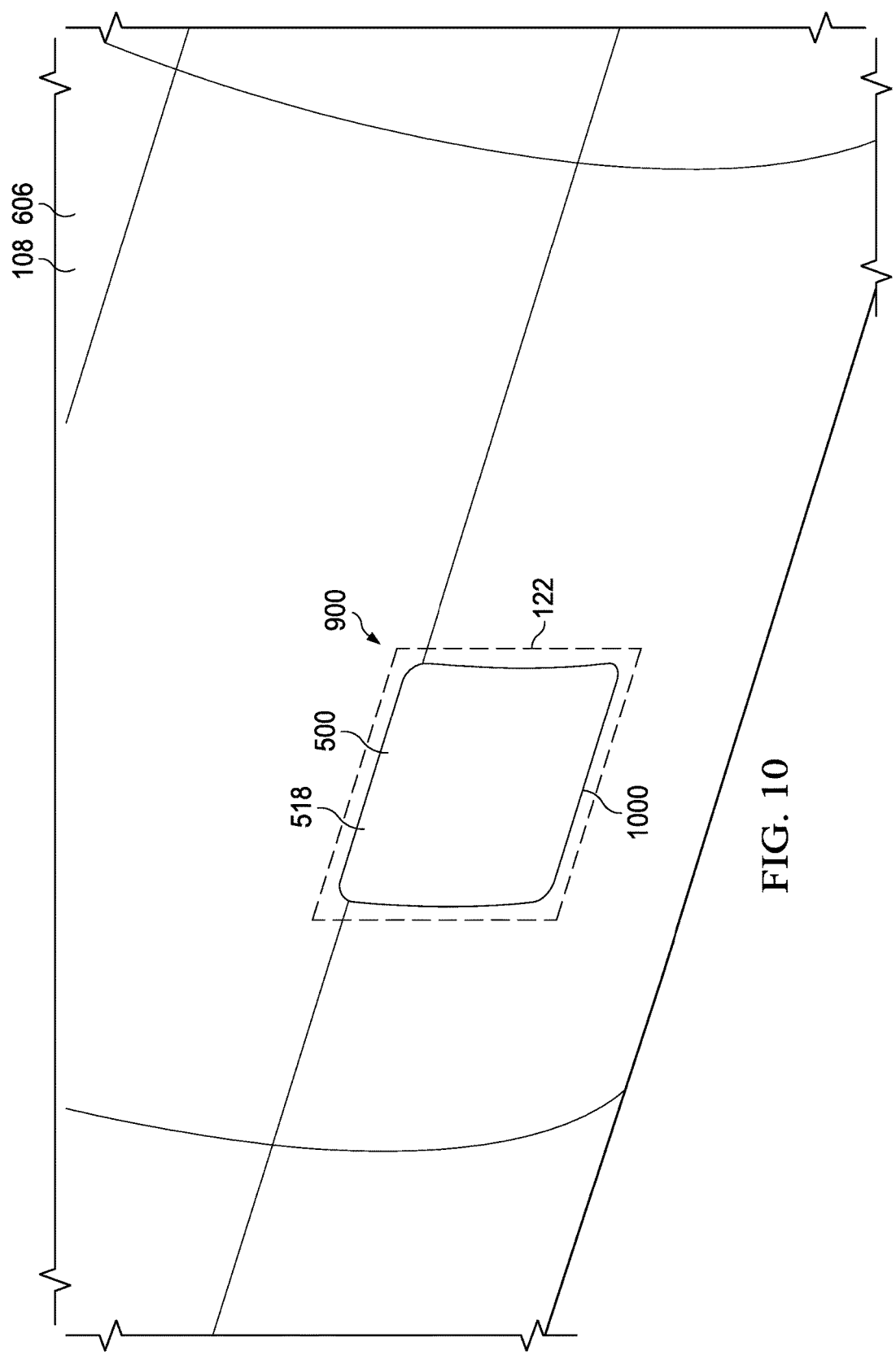
FIG. 10 is an illustration of a rework area with a composite panel attached to an aircraft in accordance with an illustrative embodiment.

Turning now to FIG. 10, an illustration of a rework area with a composite panel attached to an aircraft is depicted in accordance with an illustrative embodiment. In this example, composite panel 500 has been attached to fuselage 108 of aircraft 102. Sealant 1000 has been placed into gap 900. Coatings may be applied to rework area 122 to complete the rework on fuselage 108.

The illustration of operations performed to rework fuselage 108 in FIGS. 6-10 are not meant to limit the manner in which different illustrative embodiments may be implemented. For example, the operations in addition to or in place of trimming may occur with respect to composite panel 500. For example, coatings may be applied to composite panel 500, or other operations may be performed. Further, other structures in addition to or in place of stringers 516 may be present on inner side 512 of composite panel 500.

Figure 11:
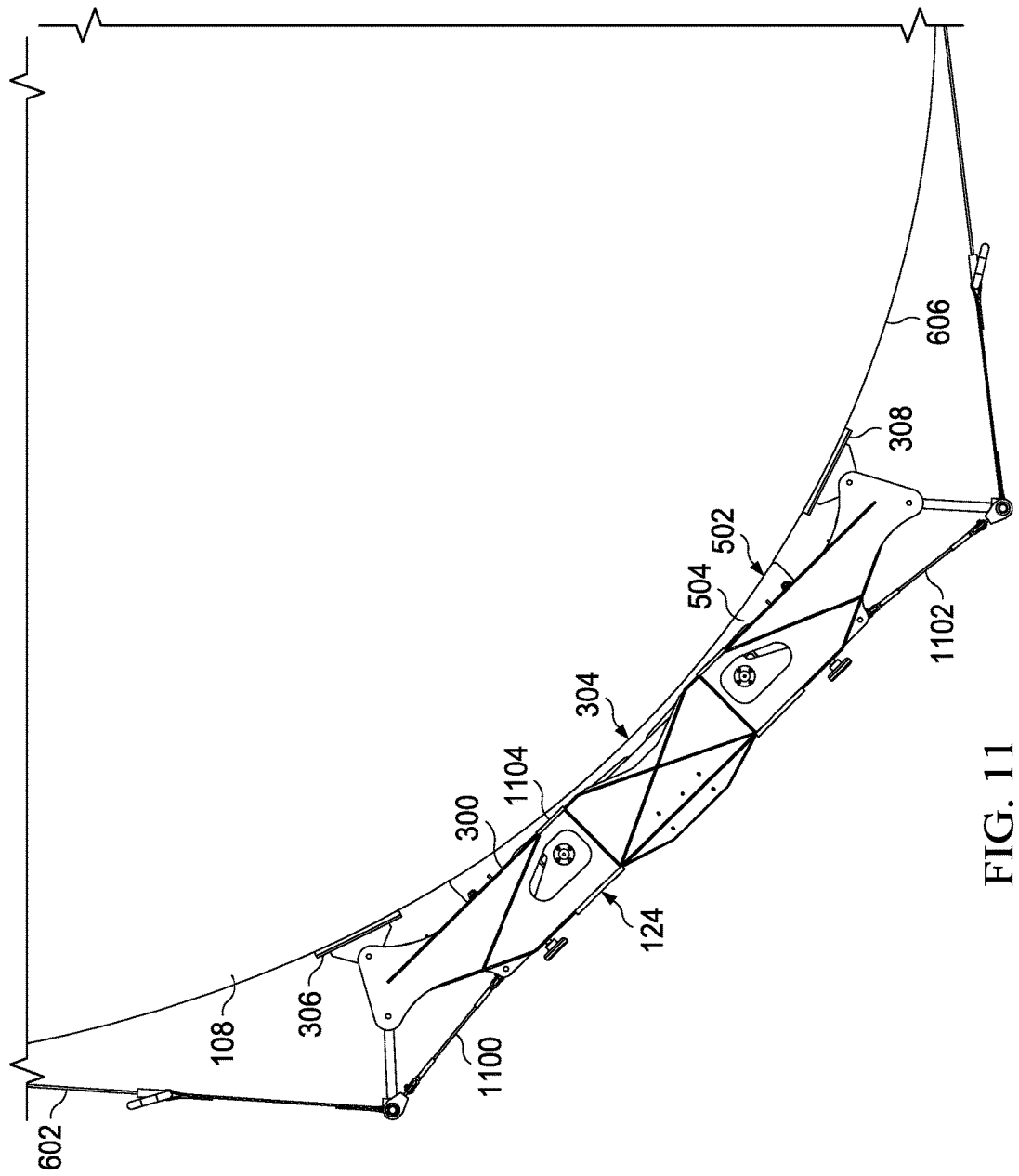
FIG. 11 is an illustration of a cross-sectional view of an aircraft with a panel tool in accordance with an illustrative embodiment.

With reference next to FIG. 11, an illustration of a cross-sectional view of an aircraft with a panel tool is depicted in accordance with an illustrative embodiment. In this illustrative example, a cross-sectional view of a portion of fuselage 108 taken along lines 4-4 in FIG. 1 is shown. In this example, strap 602 is a ratchet strap. Strap 602 in conjunction with tension cable 1100 and tension cable 1102 on rigid frame 300 create a desired amount of force on surface 606 of fuselage 108 to secure panel tool 124 to fuselage 108.

Also seen in this view are foot 306 and foot 308 on side 1104 of rigid frame 300. Foot 306 and foot 308 along with other feet not shown provide an ability for side 1104 to conform to the contour of fuselage 108.

Figure 12:
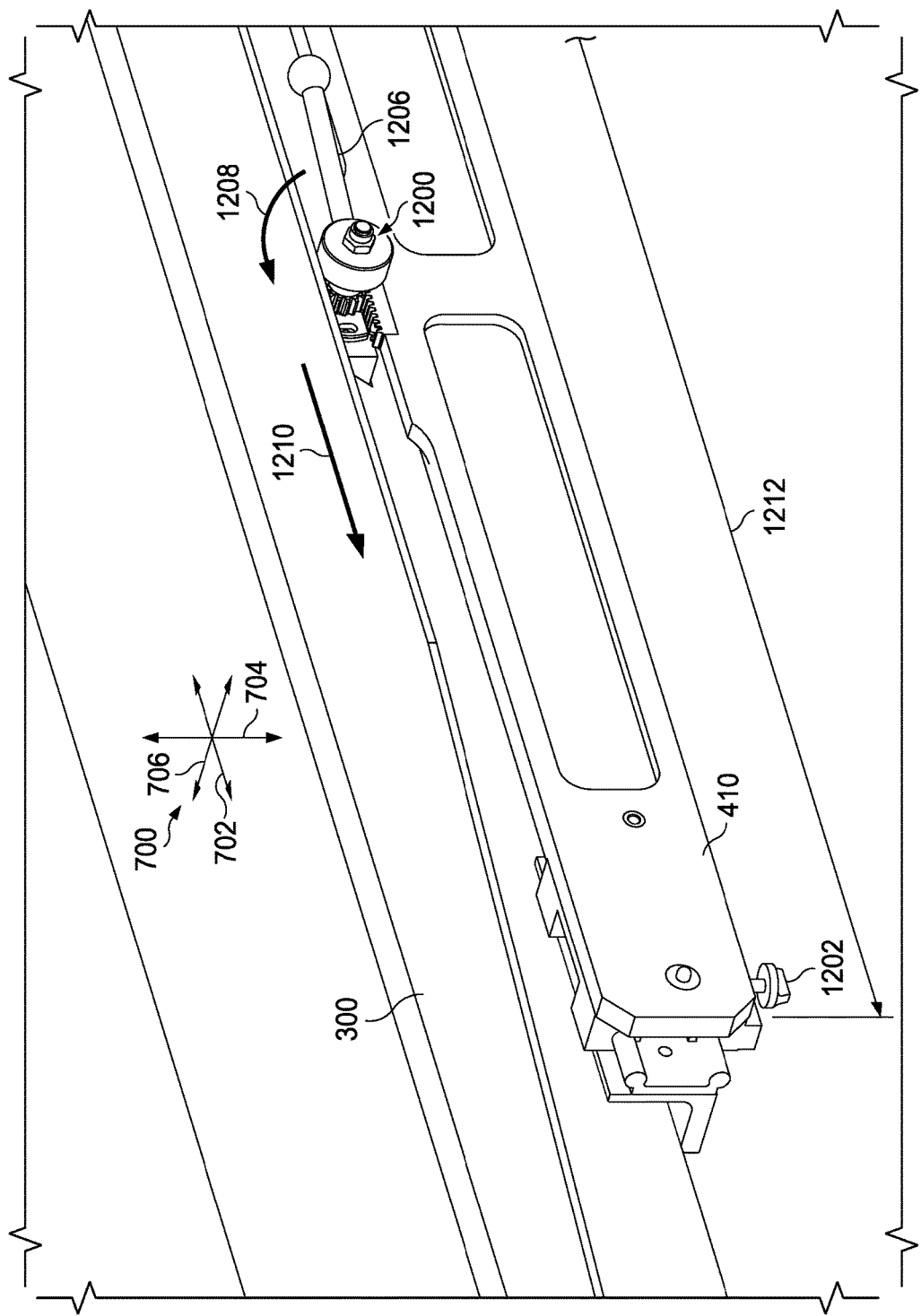
FIG. 12 is an illustration of an enlarged view of an attachment section in a mounting system in accordance with an illustrative embodiment.

Turning next to FIG. 12, an illustration of an enlarged view of an attachment section in a mounting system is depicted in accordance with an illustrative embodiment. In this depicted example, an enlarged view of attachment section 410 for mounting system 302 in FIG. 4 is shown.

As depicted, attachment section 410 has alignment device 1200 and locking mechanism 1202. Alignment device 1200 is configured to move attachment section 410 back and forth along x-axis 702 to position attachment section 410 as desired.

Alignment device 1200 takes the form of a rack and pinion in this illustrative example. In other illustrative examples, other configurations for alignment device 1200 are possible. For example, without limitation, a track system, a pulley, a gear system, a linkage, a knob, a crank, and other suitable components, or combinations of components, may be used.

In this illustrative example, alignment device 1200 has handle 1206. An operator moves handle 1206 to change the position of attachment section 410 along x-axis 702. For example, an operator may move handle 1206 in the direction of arrow 1208 to translate attachment section 410 along x-axis 702 in the direction of arrow 1210. The movement of handle 1206 may be reversed to translate attachment section 410 in the opposite direction along x-axis 702.

Once attachment section 410 is in a desired position relative to rework opening 600, locking mechanism 1202 is employed. As depicted, locking mechanism 1202 includes components configured to hold attachment section 410 in the desired position. Locking mechanism 1202 may take the form of at least one of a lock screw, a clamp, a pin, or some other suitable type of device. As depicted, attachment section 410 has length 1212.

Figure 13:
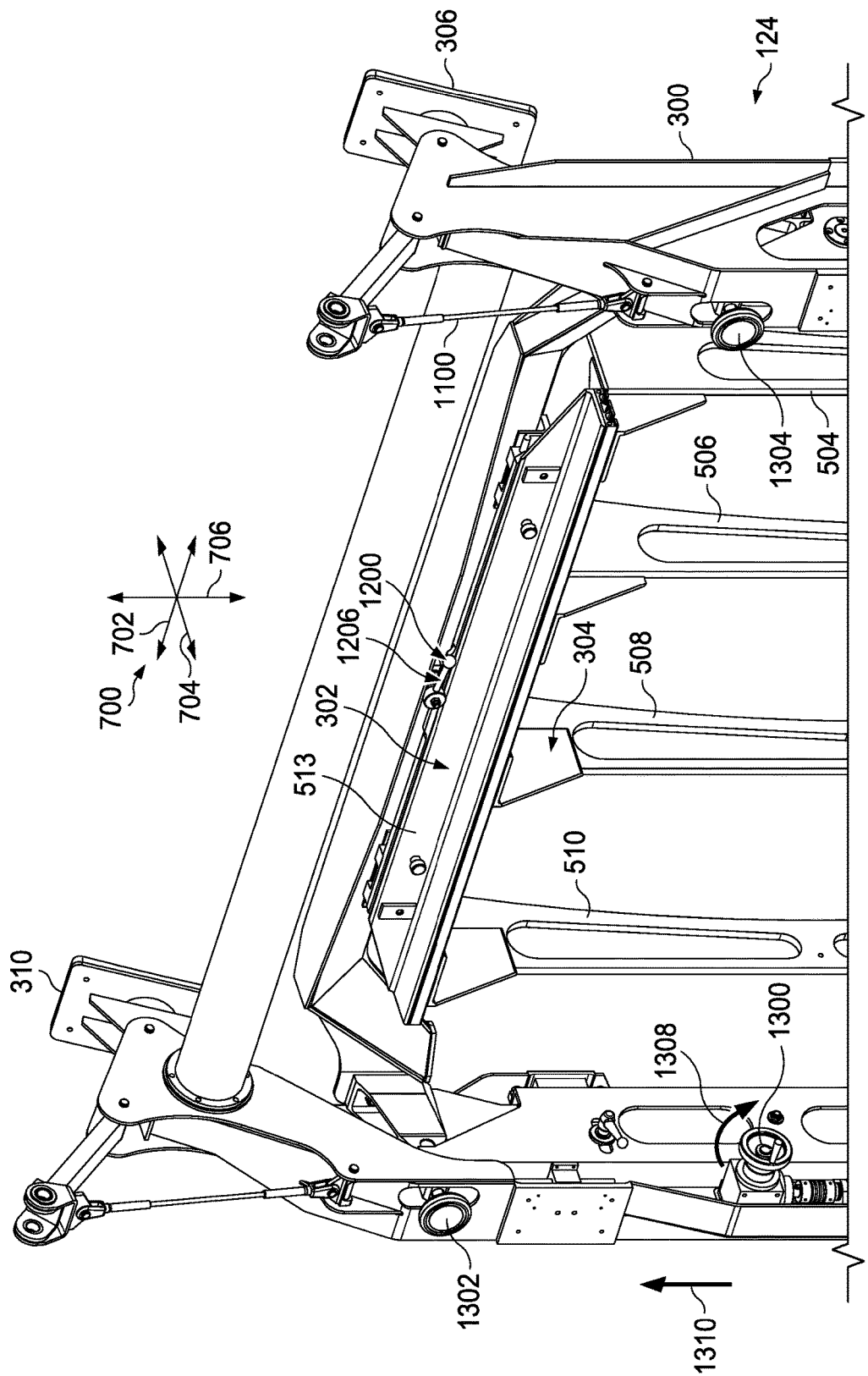
FIG. 13 is an illustration of an enlarged view of a carrier and a rigid frame in accordance with an illustrative embodiment.

With reference next to FIG. 13, an illustration of an enlarged view of a carrier and a rigid frame is depicted in accordance with an illustrative embodiment. In this illustrative example, an enlarged view of carrier 304 and rigid frame 300 is shown.

As depicted, alignment device 1300, alignment device 1302, and alignment device 1304 are connected to rigid frame 300. Alignment device 1300 takes the form of a crank in this illustrative example.

An operator uses alignment device 1300 to position carrier 304 along z-axis 706. For example, an operator may turn alignment device 1300 in the direction of arrow 1308 to move carrier 304 in the direction of arrow 1310. Alignment device 1300 may be turned in the opposite direction to move rigid frame 300 in the opposite direction along z-axis 706.

In this depicted example, alignment device 1302 and alignment device 1304 are knobs configured to adjust the position of rigid frame 300 along y-axis 704. At least one of alignment device 1302 or alignment device 1304 may be turned to move carrier 304 closer or further away from rework opening 600.

By using alignment device 1200 in FIG. 12 in combination with alignment device 1300, alignment device 1302, and alignment device 1304 shown in this figure, carrier 304 may move with six degrees of freedom. Additional knobs, locking mechanisms, screws, pins, or other components may be associated with rigid frame 300 in other illustrative examples. For example, two additional knobs may be positioned on rigid frame 300 to move carrier 304 in the y-direction.

Figure 14:
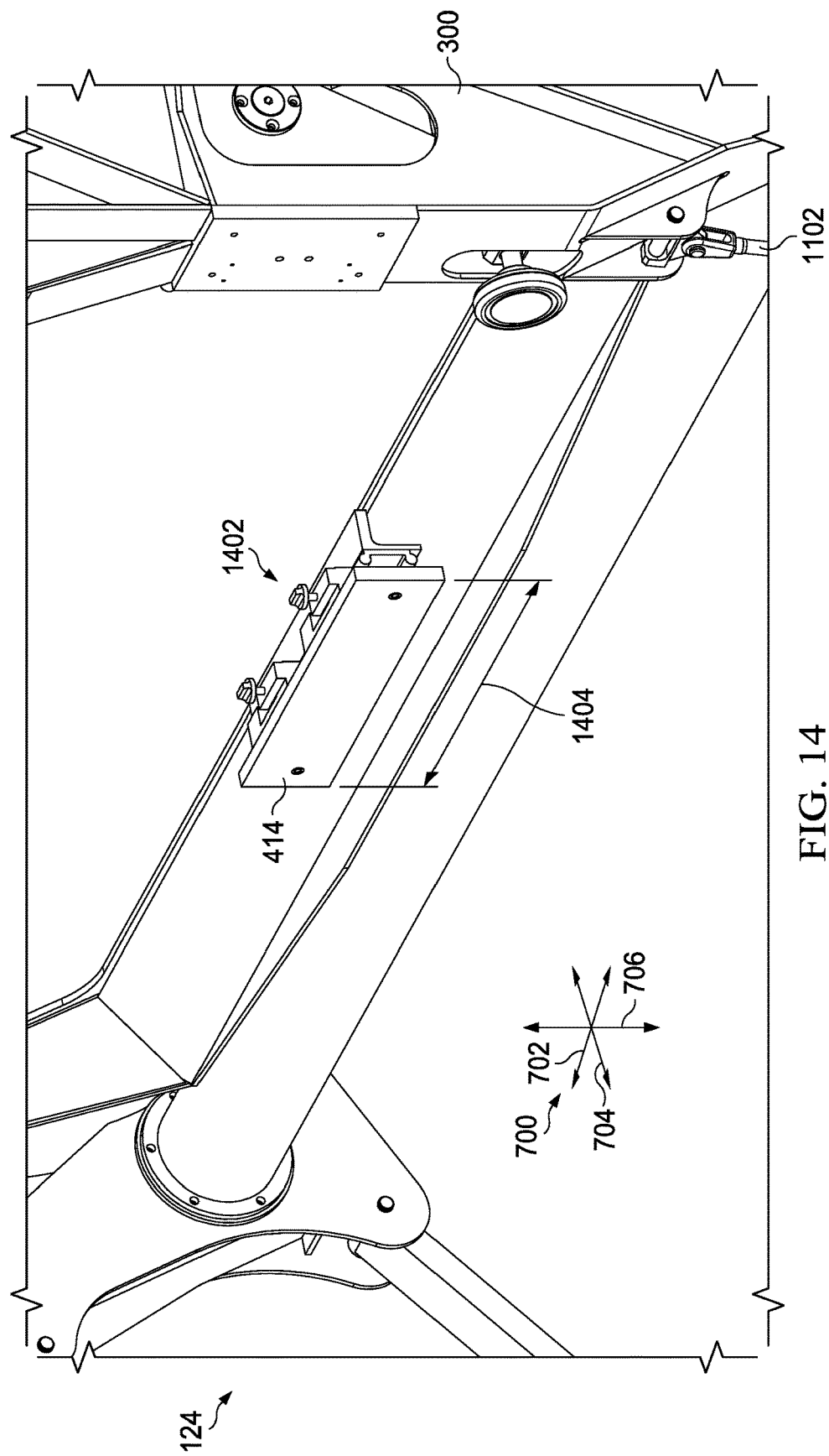
FIG. 14 is an illustration of an enlarged view of an attachment section in a mounting system in accordance with an illustrative embodiment.

Turning next to FIG. 14, an illustration of an enlarged view of an attachment section in a mounting system is depicted in accordance with an illustrative embodiment. In this depicted example, an enlarged view of attachment section 414 for mounting system 302 in FIG. 4 is shown.

As depicted, attachment section 414 has locking mechanism 1402. Attachment section 414 is configured to move back and forth along x-axis 702 when carrier 304 is attached to position attachment section 414 as desired. Additionally, attachment section 414 has length 1404. Length 1404 of attachment section 414 is less than a length of attachment section 410 in this illustrative example. This difference in length may allow for twisting of carrier 304 along or about x-axis 702.

Once attachment section 414 is in a desired position relative to rework opening 600, locking mechanism 1402 is employed. As depicted, locking mechanism 1402 includes components configured to hold attachment section 414 in the desired position. Locking mechanism 1402 may take the form of at least one of a lock screw, a clamp, a pin, or some other suitable type of device.

Figure 15:
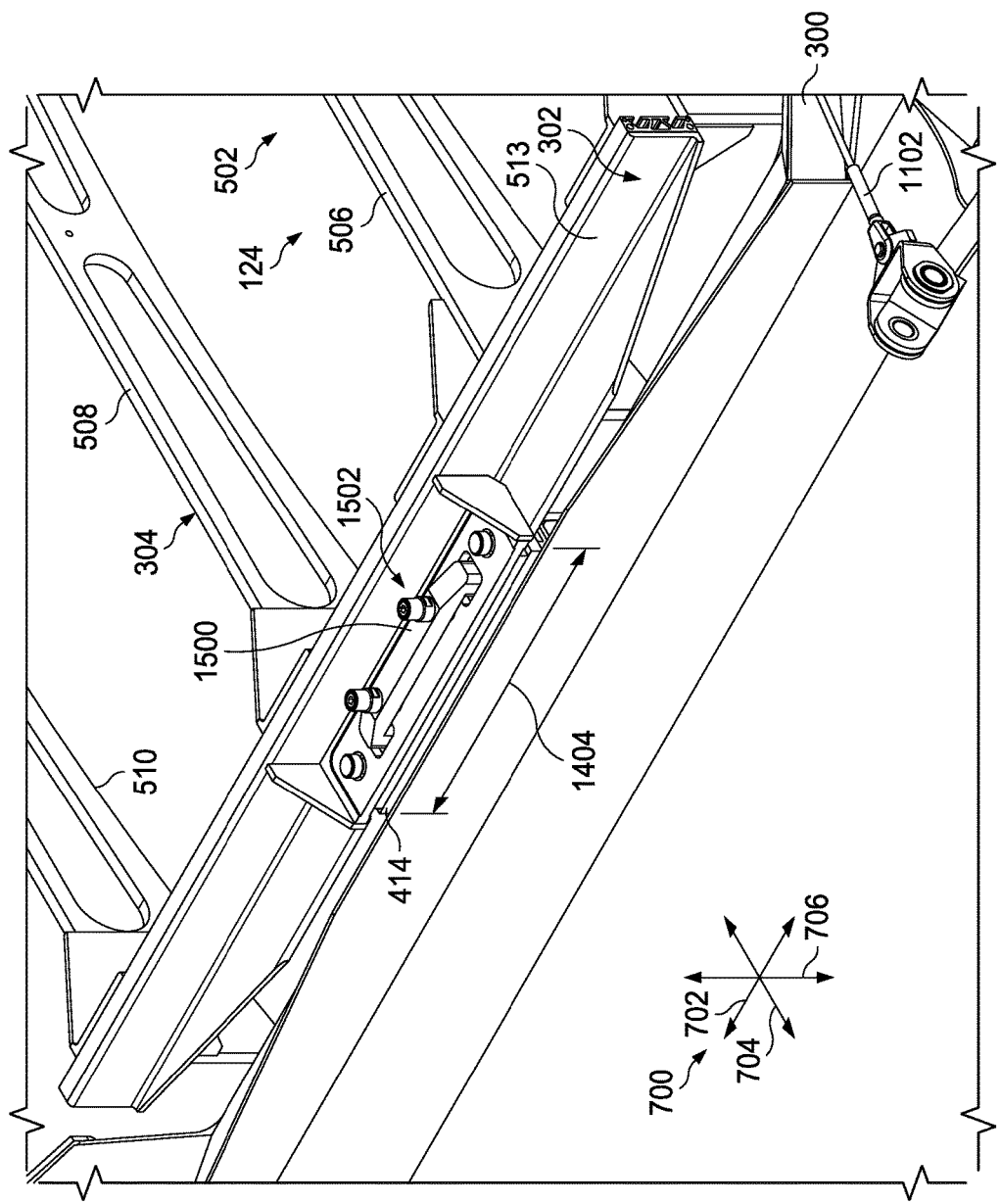
FIG. 15 is an illustration of an enlarged view of a carrier and a rigid frame in accordance with an illustrative embodiment.

With reference next to FIG. 15, an illustration of an enlarged view of a carrier and a rigid frame is depicted in accordance with an illustrative embodiment. In this illustrative example, an enlarged view of carrier 304 and rigid frame 300 is shown.

As depicted, arm 1500 with biasing system 1502 is connected to frame 513 of mounting system 302. Arm 1500 may allow carrier 304 to move slightly along x-axis 702 when a slight deformation of carrier 304 occurs as a result of an operator adjusting alignment device 1200.

Additionally, biasing system 1502 may apply pressure to frame 513 of mounting system 302. In this manner, frame 513 of mounting system 302 may slide under arm 1500 when an operator moves carrier 304 by adjusting alignment device 1200.

The different components shown in FIGS. 1 and 3-15 may be combined with components in FIG. 2, used with components in FIG. 2, or a combination of the two. Additionally, some of the components in FIGS. 1 and 3-15 may be illustrative examples of how components shown in block form in FIG. 2 can be implemented as physical structures.

Figure 16:
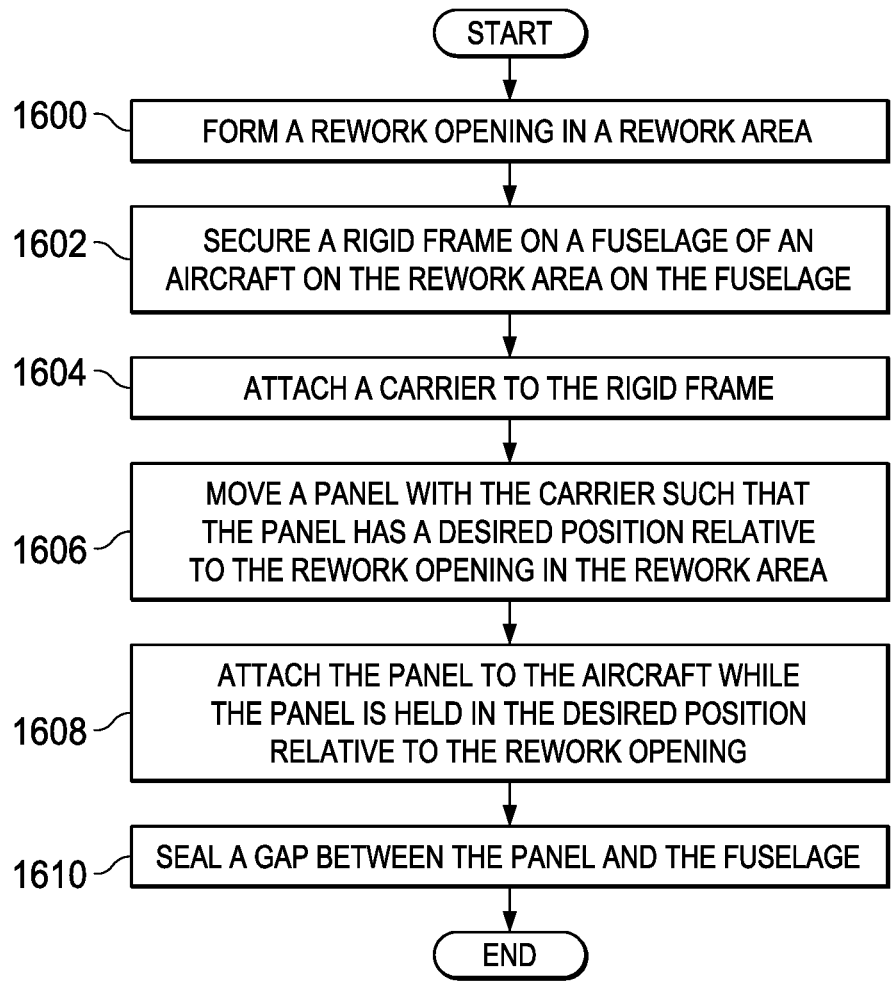
FIG. 16 is an illustration of a flowchart of a process for holding a panel in accordance with an illustrative embodiment.

Turning next to FIG. 16, an illustration of a flowchart of a process for holding a panel is depicted in accordance with an illustrative embodiment. The process in FIG. 16 may be implemented in rework environment 200. The different operations may be implemented using panel tool 212 in FIG. 2.

The process begins by forming a rework opening in a rework area (operation 1600). The process then secures a rigid frame on a fuselage of an aircraft on the rework area on the fuselage (operation 1602). The process then attaches a carrier to the rigid frame (operation 1604). The carrier is configured to hold a panel and moves the panel about a plurality of axes. The process then moves a panel with the carrier such that the panel has a desired position relative to the rework opening in the rework area (operation 1606).

The process then attaches the panel to the aircraft while the panel is held in the desired position relative to the rework opening (operation 1608). In the illustrative example, the panel floats within the rework opening when attached to the aircraft such that a gap is present between a periphery of the panel and the fuselage, wherein a load on the panel from the fuselage is reduced during operation of the aircraft. The process then seals a gap between the panel and the fuselage (operation 1610), with the process terminating thereafter.

Figure 17:
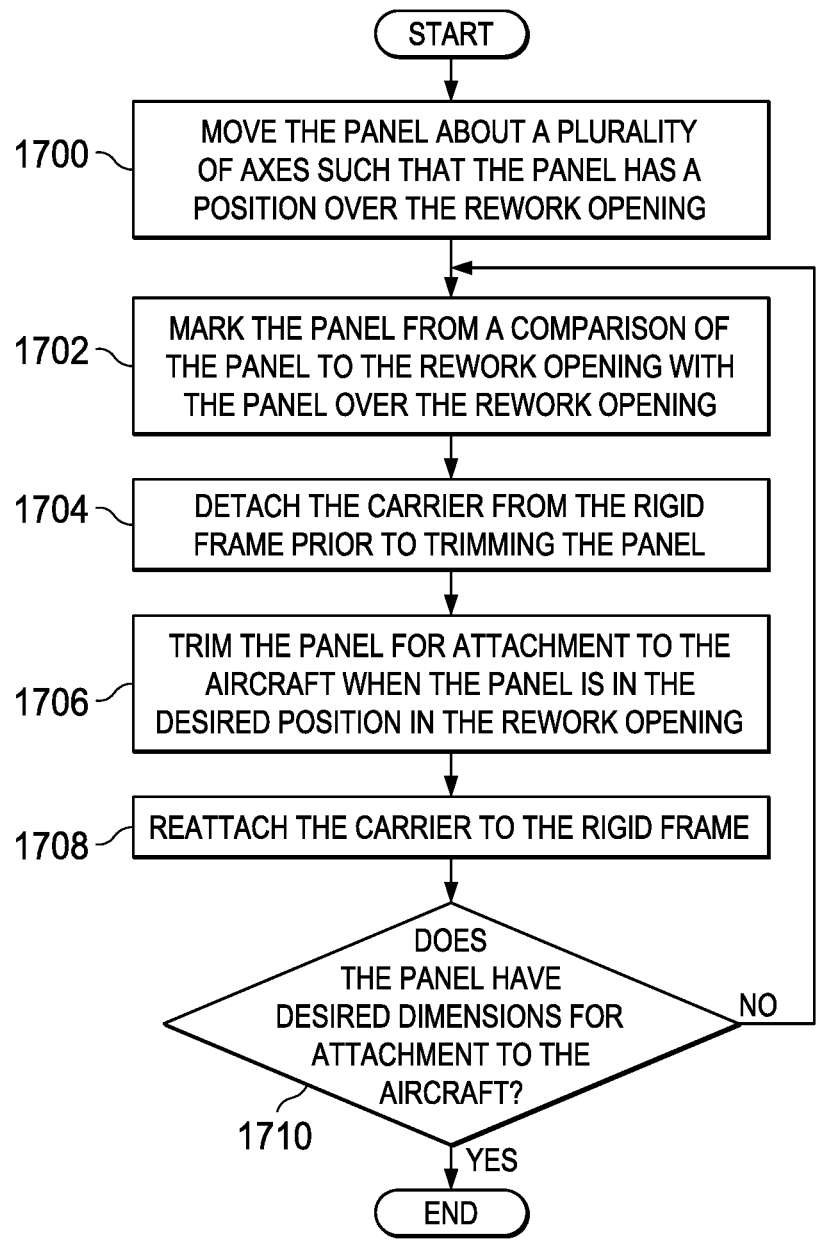
FIG. 17 is an illustration of a flowchart of a process for trimming a panel in accordance with an illustrative embodiment.

With reference now to FIG. 17, an illustration of a flowchart of a process for trimming a panel is depicted in accordance with an illustrative embodiment. The operations in FIG. 17 may be performed prior to operation 1606 in which the carrier is moved about the axes such that the panel has the desired position relative to the rework opening.

The process begins by moving the panel about a plurality of axes such that the panel has a position over the rework opening (operation 1700). The process then marks the panel from a comparison of the panel to the rework opening with the panel over the rework opening (operation 1702). The process then detaches the carrier from the rigid frame prior to trimming the panel (operation 1704)

The process then trims the panel for attachment to the aircraft when the panel is in the desired position in the rework opening (operation 1706). The process then reattaches the carrier to the rigid frame (operation 1708).

A determination is made as to whether the panel has desired dimensions for attachment to the aircraft (operation 1710). If the panel has desired dimensions, the process terminates. Otherwise, the process returns to operation 1702. These operations may be repeated any number of times until the panel has desired dimensions for attachment to the aircraft when in the desired position in the rework opening.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1600 in which a rework opening is formed may occur after operation 1602 when the rigid frame is secured to the aircraft. As another example, the process may not terminate after operation 1610. Other operations may be performed such as applying a coating to at least one of the panel or the aircraft in the rework area.

Figure 18:
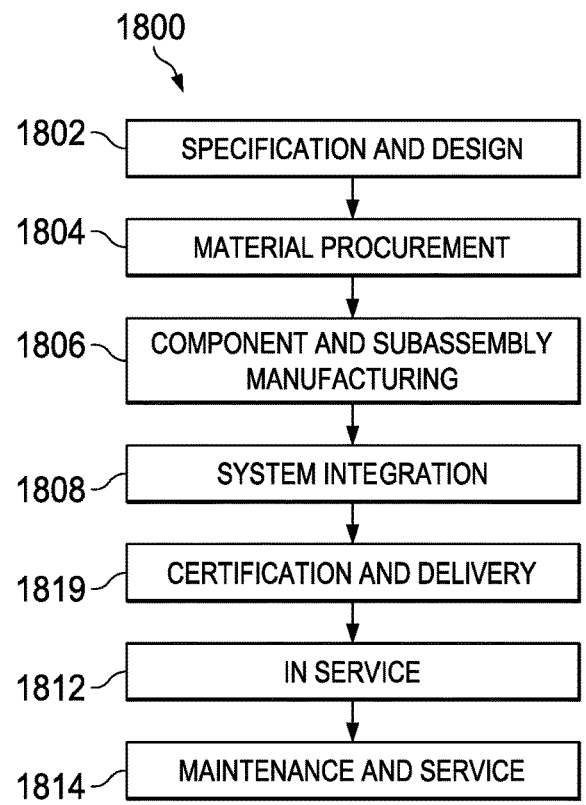
FIG. 18 is an illustration of a block diagram of an aircraft manufacturing and service method in accordance with an illustrative embodiment.
Figure 19:
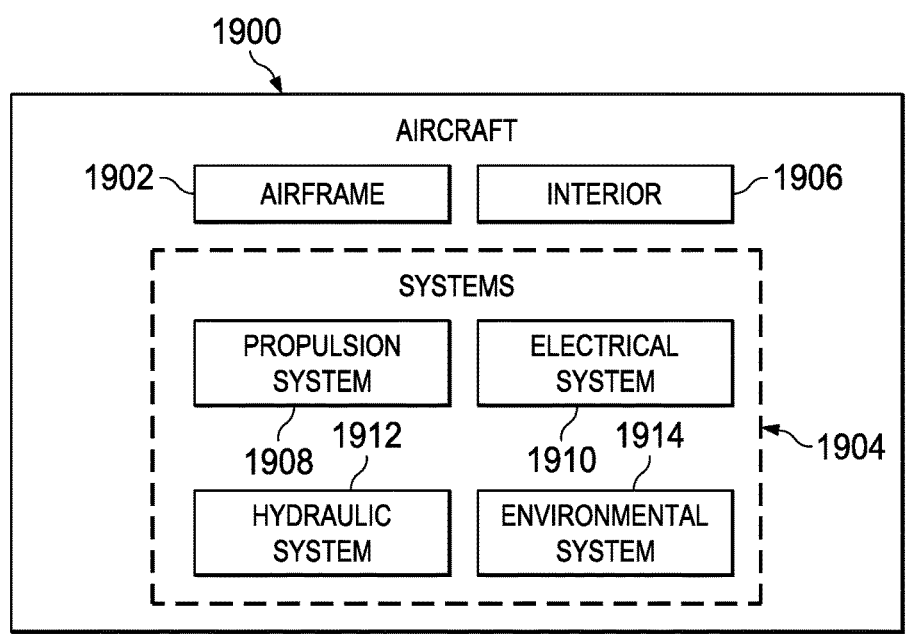
FIG. 19 is an illustration of a block diagram of an aircraft in which an illustrative embodiment may be implemented.

The illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. For example, one or more apparatus embodiments, method embodiments, or a combination thereof may be utilized while aircraft 1900 is in component and subassembly manufacturing 1806, system integration 1808, certification and delivery 1810, or maintenance and service 1814. For example, panel tool 212 may be used to perform rework of structures in aircraft 1900 that may develop inconsistencies during any of these were other stages in manufacturing and service method 1800. For example, inconsistencies may occur during manufacturing of barrels for fuselage in component and subassembly manufacturing 1806. An inconsistency may also develop while aircraft 1900 is in certification and delivery 1810. Panel tool 212 may be used to perform rework for inconsistencies that are identified during maintenance and service 1814.

The use of a number of the different illustrative embodiments may substantially expedite the assembly of aircraft 1900, reduce the cost of aircraft 1900, or both expedite the assembly of aircraft 1900 and reduce the cost of aircraft 1900. For example, with the use of a panel tool, the amount of time and effort needed by a human operator to perform rework to remove an inconsistency may be reduced. Further, the number of human operators needed to perform the rework also may be reduced.

The panel tool allows for precise positioning of a composite panel that is to be placed on the section of the fuselage that has been removed from a structure in aircraft 1900, such as a fuselage. This positioning allows for the composite panel to be positioned and removed numerous times with the same desired position. Further, the panel tool also holds the composite panel in a desired position when the composite panel is attached to the aircraft. The panel tool is especially useful when the composite panel floats within a rework opening of a fuselage of aircraft 1900. Further, different degrees of freedom provided by the panel tool allow for alignment of structures on the inner side of the composite panel to be aligned with corresponding structures in aircraft. For example, stringers on the composite panel may be aligned with corresponding stringers in aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a carrier comprising a first frame and a plurality of cross members within the first frame, each cross member contoured along a leading edge;
   a rigid second frame sized to accommodate the carrier, wherein the rigid second frame comprises:
      first and second opposing sides that include contact elements configured as contact points for the rigid second frame against a surface, wherein the first and second opposing sides of the rigid second frame each comprise a first alignment device, a second alignment device, and a third alignment device, wherein said adjustment devices in first and second sides of the rigid second frame are configured to allow the carrier to move with six degrees of freedom within the rigid second frame; and
      third and fourth opposing sides; and
   a mounting system associated with the third and fourth sides of the rigid second frame, wherein the mounting system is configured to removably hold the carrier within the rigid second frame, and wherein the mounting system further comprises an adjustment mechanism configured to move the carrier about a plurality of axes within the rigid second frame.

2. The apparatus of claim 1, wherein the carrier is configured to hold a panel having a first contour matching a second contour of a fuselage of an aircraft at a rework area.

3. The apparatus of claim 2, wherein the cross members of the carrier are contoured to match the first contour of the panel.

4. The apparatus of claim 2, wherein the panel is a patch for a fuselage of the aircraft.

5. The apparatus of claim 2, wherein the carrier is configured to hold the panel in a floating position during installation, such that loads are not transferred from the fuselage, to which the mounting system is attached, to the panel.

6. The apparatus of claim 5, wherein the carrier is configured to hold the panel in the floating position by bearing a weight of the panel, with the weight being transferred from the carrier to the mounting system, thence to the rigid second frame, and thence to the fuselage when the rigid second frame is held to the fuselage.

7. The apparatus of claim 1 further comprising:
   an attachment system configured to secure the rigid second frame to a fuselage of an aircraft, wherein the attachment system comprises:
      a first strap attachment device connected to a first end of the first side of the rigid second frame, and configured to hold a first strap;
      a second strap attachment device connected to a second end of the first side of the rigid second frame, and configured to hold a second strap;
      a third strap attachment device connected to a first end of the second side of the rigid second frame, and configured to hold a third strap; and
      a fourth strap attachment device connected to a second end of the second side of the rigid second frame, and configured to hold a fourth strap.

8. The apparatus of claim 1, wherein the contact elements comprise rotatable feet.

9. The apparatus of claim 1, wherein the mounting system is configured to move the carrier about the plurality of axes with at least one of longitudinal movement or twisting movement.

10. The apparatus of claim 1, wherein the rigid second frame is configured to be secured to a fuselage of an aircraft using at least one of a group of straps, double sided tape, friction contact, or a vacuum system.

11. The apparatus of claim 1, wherein the first and second opposing sides of the rigid second frame each further comprise a center truss structure.

12. An apparatus comprising:
   a rigid frame;
   a mounting system connected to opposing first and second sides of the rigid frame;
   a carrier configured to hold a panel, wherein the carrier is removably connected to the mounting system;
   a first strap attachment device connected to a first corner flange of the rigid frame and configured to hold a first strap;
   a first tension cable connecting the first strap attachment device to a first alignment device that is connected to a third side of the rigid frame;
   a second strap attachment device connected to a second corner flange of the rigid frame, and configured to hold a second strap;
   a second tension cable connecting the second strap attachment device to a second alignment device that is connected to the third side of the rigid frame;
   a third strap attachment device connected to a third corner flange of the rigid frame, and configured to hold a third strap;
   a third tension cable connecting the third strap attachment device to a third alignment device that is connected to a fourth side of the rigid frame;
   a fourth strap attachment device connected a fourth corner flange of the rigid frame, and configured to hold a fourth strap; and
   a fourth tension cable connecting the fourth strap attachment device to a fourth alignment device that is connected to the fourth side of the rigid frame.

13. The apparatus of claim 12 further comprising:
an adjustment system connected to third and fourth opposed sides of the rigid frame, the adjustment system configured to align and adjust a position of the rigid frame relative to a solid surface.

14. The apparatus of claim 13, wherein the adjustment system comprises a first foot and a second foot on a third side of the rigid frame, and a third foot and a fourth foot on a fourth side of the rigid frame.

15. The apparatus of claim 14, wherein the first foot, the second foot, the third foot, and the fourth foot are individually rotatable with respect to the rigid frame.

16. The apparatus of claim 15, wherein the first foot is connected to the rigid frame via the first corner flange, wherein the second foot is connected to the rigid frame via the second corner flange, wherein the third foot is connected to the rigid frame via the third corner flange, wherein the fourth foot is connected to the rigid frame via the fourth corner flange.

17. The apparatus of claim 12 further comprising:
a fifth alignment device connected to the first side of the rigid frame, and configured to move an attachment section of the mounting system using a first rack and pinion device; and
a sixth alignment device connected to the second side of the rigid frame, and configured to move the attachment section of the mounting system using a second rack and pinion device.

18. The apparatus of claim 17 further comprising:
a locking system configured to lock a position of the mounting system with respect to the rigid frame.

19. The apparatus of claim 18 further comprising:
a biasing system comprising an adjustable arm connected to the mounting system and configured to adjust a position of the carrier within the mounting system.

20. The apparatus of claim 12, wherein the rigid frame further comprises a seventh alignment device and an eighth alignment device.

21. The apparatus of claim 20, wherein the seventh alignment device and the eighth alignment device comprise a crank.

22. The apparatus of claim 20, wherein the seventh alignment device and the eighth alignment device move the rigid frame along a z-axis.

23. The apparatus of claim 12, wherein the first alignment device, the second alignment device, the third alignment device, and the fourth alignment device comprise a knob.

24. The apparatus of claim 12, wherein the first alignment device, the second alignment device, the third alignment device, and the fourth alignment device move the rigid frame along a y-axis.

* * * * *